US011064184B2

(12) United States Patent
Choi et al.

(10) Patent No.: US 11,064,184 B2
(45) Date of Patent: Jul. 13, 2021

(54) AERIAL VEHICLE IMAGING AND TARGETING SYSTEM

(71) Applicant: Aurora Flight Sciences Corporation, Manassas, VA (US)

(72) Inventors: Jae-Woo Choi, Manassas, VA (US); James D. Paduano, Boston, MA (US)

(73) Assignee: Aurora Flight Sciences Corporation, Manassas, VA (US)

( * ) Notice: Subject to any disclaimer, the term of this patent is extended or adjusted under 35 U.S.C. 154(b) by 48 days.

(21) Appl. No.: 16/027,683

(22) Filed: Jul. 5, 2018

(65) Prior Publication Data

US 2019/0068953 A1 Feb. 28, 2019

Related U.S. Application Data

(60) Provisional application No. 62/550,331, filed on Aug. 25, 2017.

(51) Int. Cl.
*G06K 9/00* (2006.01)
*H04N 13/239* (2018.01)
(Continued)

(52) U.S. Cl.
CPC ......... *H04N 13/239* (2018.05); *B64C 39/024* (2013.01); *F41H 11/02* (2013.01);
(Continued)

(58) Field of Classification Search
None
See application file for complete search history.

(56) References Cited

U.S. PATENT DOCUMENTS

| 5,317,689 A | 5/1994 | Nack et al. |
| 5,953,110 A * | 9/1999 | Burns ............................... 356/5 |

(Continued)

FOREIGN PATENT DOCUMENTS

| CN | 105759834 | 7/2016 |
| EP | 3168704 | 5/2017 |

(Continued)

OTHER PUBLICATIONS

Texas Instruments digital micromirror device (http://www.ti.com/dlp-chip/overview.html) (Year: 0000).*

(Continued)

*Primary Examiner* — Shadan E Haghani
(74) *Attorney, Agent, or Firm* — Michael Stanley Tomsa; McAndrews, Held & Malloy, Ltd.; Eugene H. Nahm

(57) ABSTRACT

The subject disclosure relates to a tracking system to mount to an aircraft and to image and track a target aircraft. The tracking system may include a structured light source operatively coupled to a processor, an inertial measurement unit (IMU) operatively coupled with the processor, a mirror to steer light from the light source toward the target aircraft, and a stereo-vision system having a first camera and a second camera. The IMU may be configured to generate position data representing a position of the aircraft. The stereo-vision system may be operatively coupled to the processor and configured to determine a 3D position of the target aircraft as a function of the position data. The processor may be configured to adjust the mirror position as a function of a mirror position.

20 Claims, 20 Drawing Sheets

(51) Int. Cl.
  *G03B 15/00* (2021.01)
  *G02B 26/08* (2006.01)
  *B64C 39/02* (2006.01)
  *F41H 13/00* (2006.01)
  *G01S 17/89* (2020.01)
  *G01B 11/25* (2006.01)
  *G05D 1/00* (2006.01)
  *G01S 17/66* (2006.01)
  *F41H 11/04* (2006.01)
  *G01S 17/86* (2020.01)
  *F41H 11/02* (2006.01)

(52) U.S. Cl.
  CPC ............ *F41H 11/04* (2013.01); *F41H 13/00* (2013.01); *F41H 13/005* (2013.01); *G01B 11/25* (2013.01); *G01B 11/2545* (2013.01); *G01S 17/66* (2013.01); *G01S 17/86* (2020.01); *G01S 17/89* (2013.01); *G02B 26/0833* (2013.01); *G03B 15/006* (2013.01); *G05D 1/0094* (2013.01); *G06K 9/00671* (2013.01); *B64C 2201/024* (2013.01); *B64C 2201/127* (2013.01)

(56) References Cited

U.S. PATENT DOCUMENTS

| | | | |
|---|---|---|---|
| 7,102,496 | B1 | 9/2006 | Ernst, Jr. et al. |
| 7,768,527 | B2 | 8/2010 | Zhang et al. |
| 8,380,425 | B2 * | 2/2013 | Duggan ............ G08G 5/0069 244/175 |
| 8,543,265 | B2 | 9/2013 | Ekhaguere et al. |
| 8,619,265 | B2 | 12/2013 | Steffey et al. |
| 8,654,314 | B2 * | 2/2014 | King ................ F41H 13/005 250/201.6 |
| 9,010,683 | B2 | 4/2015 | Gundlach et al. |
| 9,314,150 | B2 * | 4/2016 | Chen ................ G06T 7/521 |
| 9,594,250 | B2 | 3/2017 | Tait et al. |
| 9,817,396 | B1 | 11/2017 | Takayama et al. |
| 10,073,454 | B2 | 9/2018 | Aboutalib et al. |
| 10,137,984 | B1 | 11/2018 | Flick |
| 10,303,172 | B2 | 5/2019 | Hwang et al. |
| 10,315,764 | B2 | 6/2019 | Shannon et al. |
| 10,467,885 | B2 | 11/2019 | Trundle et al. |
| 2005/0031169 | A1 | 2/2005 | Shulman et al. |
| 2010/0003652 | A1 | 1/2010 | Lavie et al. |
| 2014/0063204 | A1 | 3/2014 | Siercks |
| 2014/0375951 | A1 * | 12/2014 | Barth ................ A61B 3/0008 351/206 |
| 2015/0064658 | A1 | 3/2015 | Hales et al. |
| 2016/0035224 | A1 | 2/2016 | Yang et al. |
| 2016/0091894 | A1 | 3/2016 | Zhang et al. |
| 2016/0349746 | A1 * | 12/2016 | Grau ................ G05D 1/0094 |
| 2016/0364989 | A1 | 12/2016 | Speasl et al. |
| 2017/0039764 | A1 | 2/2017 | Hu et al. |
| 2017/0059692 | A1 | 3/2017 | Laufer |
| 2017/0061813 | A1 | 3/2017 | Tao et al. |
| 2017/0067734 | A1 | 3/2017 | Heidemann et al. |
| 2017/0094251 | A1 | 3/2017 | Wolke et al. |
| 2017/0144756 | A1 | 5/2017 | Rastgaar Aagaah et al. |
| 2017/0235316 | A1 | 8/2017 | Shattil |
| 2018/0162530 | A1 * | 6/2018 | Klein ................ B64C 39/024 |
| 2018/0164080 | A1 | 6/2018 | Chi-Hseuh |
| 2018/0244401 | A1 * | 8/2018 | Kilian ................ B64F 1/02 |
| 2018/0335779 | A1 * | 11/2018 | Fisher ................ G05D 1/0094 |
| 2019/0025858 | A1 | 1/2019 | Bar-Nahum et al. |
| 2019/0025687 | A1 | 3/2019 | Shaw et al. |
| 2019/0228571 | A1 | 7/2019 | Atsmon |
| 2020/0231054 | A1 | 7/2020 | Resnick |

FOREIGN PATENT DOCUMENTS

| | | |
|---|---|---|
| WO | 2015029007 A1 | 3/2015 |
| WO | 2017008207 A1 | 1/2017 |

OTHER PUBLICATIONS

Haddad, Acoustic Self Localization, IEEE (Year: 2016).*
Extended European search report for Application No. 18189291.0 dated Dec. 20, 2018.

* cited by examiner

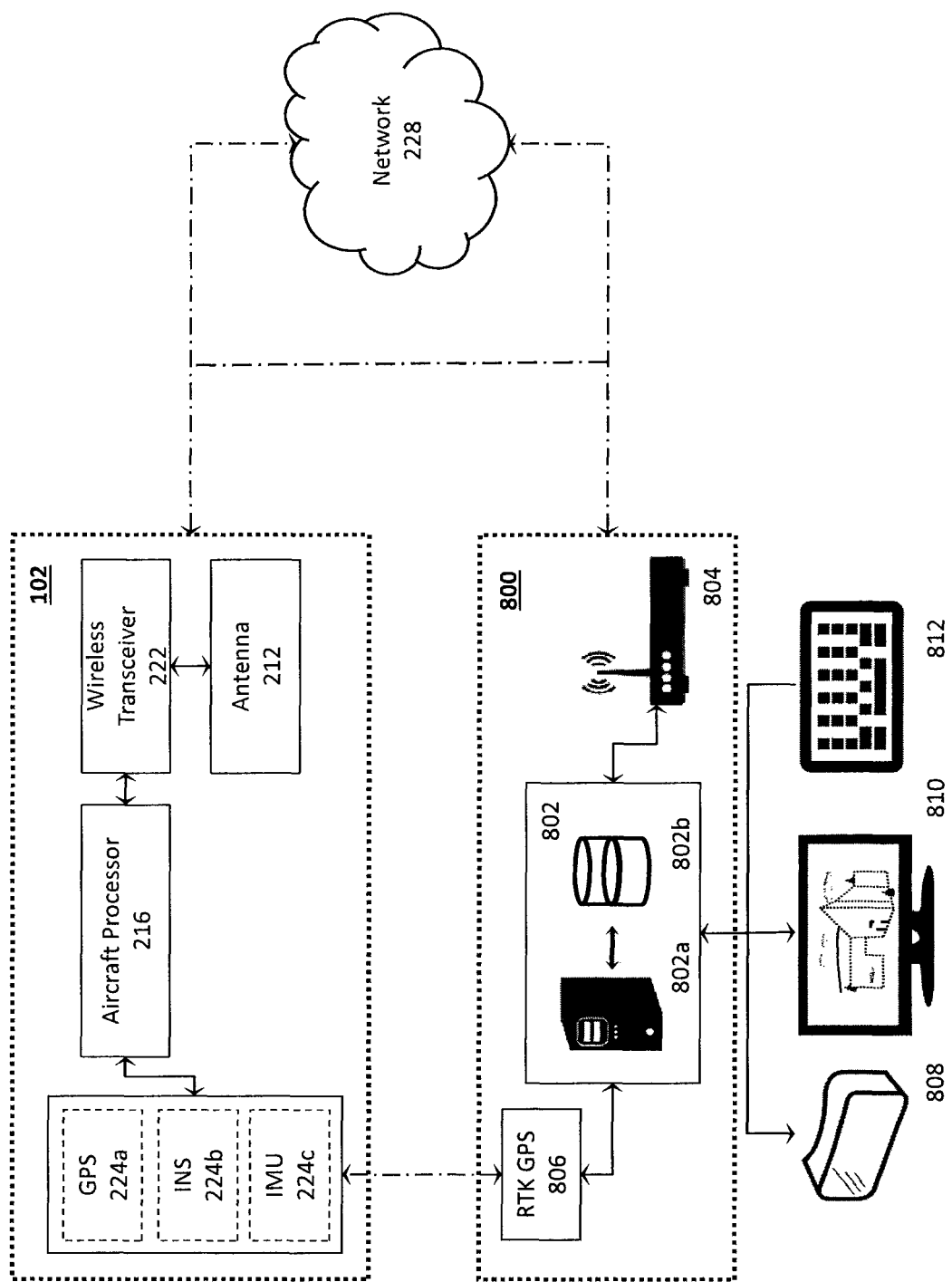

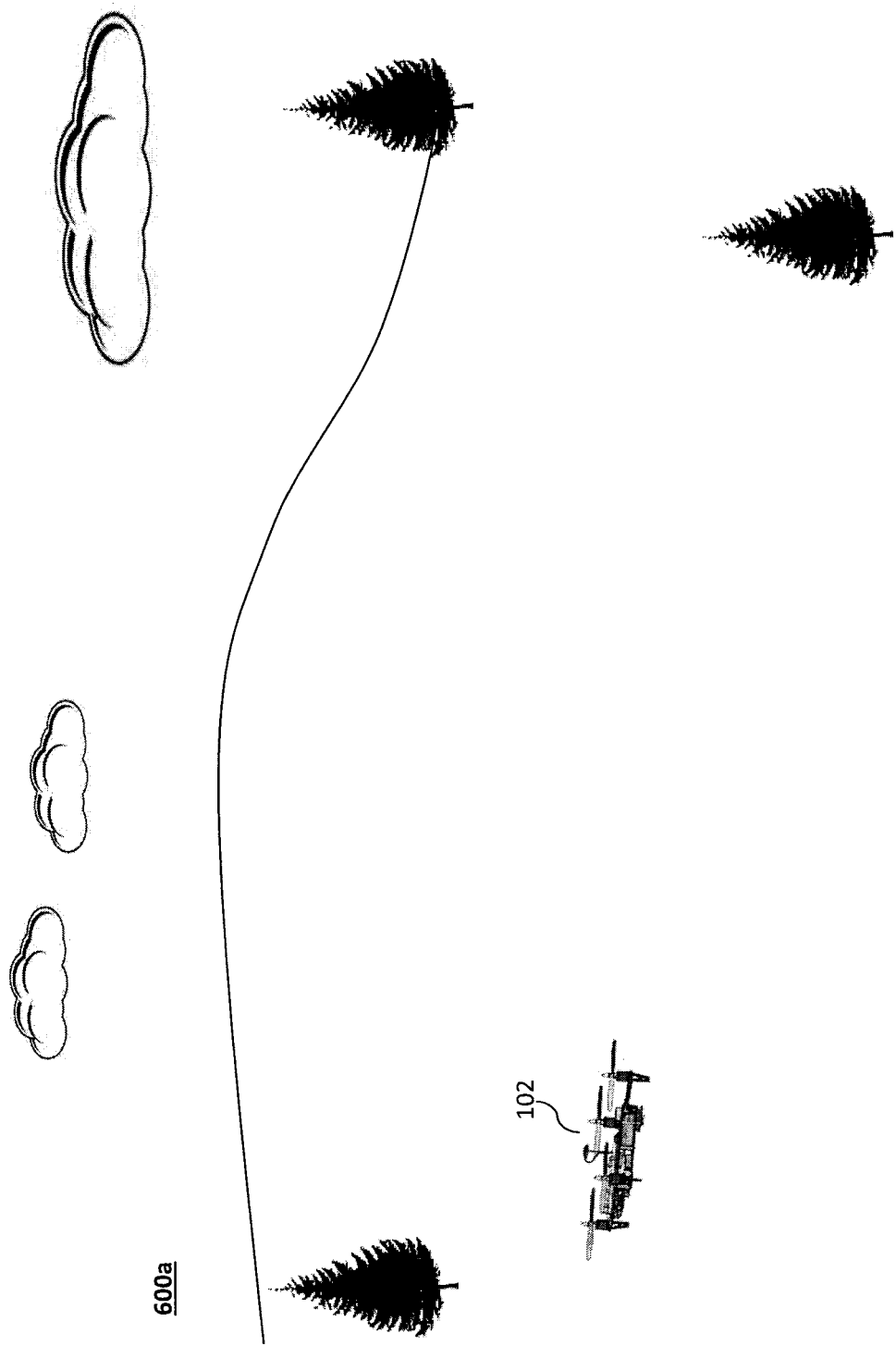

AERIAL VEHICLE IMAGING AND TARGETING SYSTEM

CROSS-REFERENCE

The present application claims the benefit under 35 U.S.C. § 119(e) of U.S. Provisional Patent Application Ser. No. 62/550,331, filed Aug. 25, 2017 and titled "Aerial Vehicle Imaging and Targeting System," the contents of which are hereby incorporated by reference.

FIELD

The subject disclosure relates to aircraft, aerial systems, and virtual reality systems for use with aerial systems.

BACKGROUND

Existing aerial defense systems are poorly suited for defending against invasive low-cost unmanned aerial vehicles (UAVs), such as commercially-available UAVs, which can be used to carry improvised weapons and/or surveillance systems. For example, traditional defense systems against rockets, artillery, and mortars typically involve anti-aircraft missiles or guns (e.g., the Phalanx close-in weapon system, CWIS). Such systems, however, are often impractical and cost-prohibitive due to their relative expensive compared to the potential harm caused by an aerial threat. Other defense systems solutions use tube-launched small unmanned aerial systems (UASs). These tube-launches systems, however, are slower and/or less maneuverable due to, inter alfa, their necessity to fit inside a tube. That is, the sizing requirements result in design sacrifices (e.g., removal of certain control surfaces).

As can be appreciated, to mitigate asymmetric attack, aerial defense systems should employ defensive vehicles/aircraft that are comparable to the cost of a given target aircraft or objects (e.g., an invasive attacking vehicle). The aerial defense systems should be further configured to defend against large numbers of target aircraft, while using defensive aircraft that are sufficiently fast and maneuverable to intercept and/or to otherwise incapacitate the target aircraft. To track a target aircraft, existing anti-aircraft systems use sensors mounted to gimbals and/or turrets. While these anti-aircraft systems are suitable for target aircraft situated at a distance, they are not suitable for proximate (i.e., nearby), fast moving, objects/aircraft. Therefore, the aerial defense system should employ an imaging system and method to track, image, and target proximate target aircraft during flight.

To provide remote control, monitoring, and/or testing of the aerial defense system and its defensive aircraft, the aerial defense system may further employ a virtual reality system to generate an aerial simulation environment. Through the aerial simulation environment, improved autonomy may be developed and evaluated at reduced costs by, inter alfa, decreasing the number of experimental flight hours, reducing technical risks associated with flight vehicle accidents, and improving the timeliness and thoroughness of test and evaluation outcomes by enabling the use of simulations to model the probability of different outcomes and flight-based verification of the algorithmic robustness against all possible scenarios.

In view of the forgoing, a need exists for an improved anti-aircraft system. A need also exists for an anti-aircraft system configured to guard against large numbers of invasive vehicles. In addition, there is a need for a virtual or augmented reality system to generate an aerial simulation environment using, for example, both real world input and simulated input.

SUMMARY

Disclosed herein are an aircraft, aerial system, and virtual reality system for use with the aerial system.

According to a first aspect, a tracking system to mount to a vehicle and to image and track an object comprises: a structured light source operatively coupled to a processor; an inertial measurement unit (IMU) operatively coupled with the processor, wherein the IMU is configured to generate position data representing a position of the vehicle; a mirror to steer light from the light source toward the object; and a stereo-vision system having a first camera and a second camera, the stereo-vision system being operatively coupled to the processor, wherein the stereo-vision system is configured to determine a three-dimensional position of the object as a function of the position data.

In certain aspects, the mirror is configured to direct the light from the light source toward the object as a function of a mirror position, wherein the processor is configured to adjust the mirror position.

In certain aspects, the structured light source is an LED or laser light source.

In certain aspects, the structured light source is a laser light source configured to generate light with a wavelength in the 450-495 nm light spectrum.

In certain aspects, the stereo-vision system includes a 450 nm bandpass filter.

In certain aspects, the structured light source is a laser light source configured to generate light with a wavelength in the blue light spectrum.

In certain aspects, the stereo-vision system includes a bandpass filter.

In certain aspects, the mirror is an electro-mechanical systems (MEMS) mirror.

In certain aspects, the first camera provides a first field of view (FOV) and the second camera provides a second FOV.

In certain aspects, the structured light source is configured to generate light that overlaps with at least a portion of each of the first FOV and the second FOV.

In certain aspects, at least a portion of the first FOV and overlaps with a portion of the second FOV overlap.

In certain aspects, the stereo-vision system is operatively coupled to the processor via a Universal Serial Bus. (USB).

In certain aspects, the processor is configured to control positions of each of the mirror, the first camera, and the second camera based at least in part on the position data from the IMU.

In certain aspects, the vehicle is an aircraft and the object is in motion.

According to a second aspect, a method of imaging and tracking an object using a sensor payload mounted to a vehicle comprises the steps of: generating, an inertial measurement unit (IMU) operatively coupled with a processor, position data reflecting a position of the vehicle; generating light via a structured light source operatively coupled to the processor; steering the light from the structured light source toward the object via a mirror as a function of a mirror position, wherein the processor is configured to adjust the mirror position; and determining, via a stereo-vision system couple to the processor, a three-dimensional position of the object as a function of the position data, wherein the stereo-vision system comprises a first camera and a second camera.

In certain aspects, the structured light source is a laser light source configured to generate light with a wavelength in the 450-495 nm light spectrum.

In certain aspects, the structured light source is a laser light source configured to generate light with a wavelength in the blue light spectrum.

In certain aspects, the mirror is an electro-mechanical systems (MEMS) mirror.

In certain aspects, the first camera provides a first field of view (FOV) and the second camera provides a second FOV, and the light illuminates an area that overlaps with at least a portion of each of the first FOV and the second FOV.

In certain aspects, at least a portion of the first FOV overlaps with a portion of the second FOV.

In certain aspects, the processor is configured to control a position of each of the mirror, the first camera, and the second camera based at least in part on the position data from the IMU.

According to a third aspect, an aircraft to image and track a moving object comprises: an airframe; a structured light source mounted to the airframe and operatively coupled to a processor; an inertial measurement unit (IMU) operatively coupled with the processor, wherein the IMU is configured to generate position data representing a position of the aircraft; a mirror to steer light from the light source as a function of a mirror position, wherein the processor is configured to adjust the mirror position; and a stereo-vision system having a first camera and a second camera, the stereo-vision system being mounted to the airframe and operatively coupled to the processor, wherein the stereo-vision system is configured to determine a three-dimensional position of the moving object relative to the aircraft.

In certain aspects, the mirror is configured to direct the light from the light source toward the moving object based at least in part on the position data from the IMU.

In certain aspects, the processor is configured to control a position of the mirror based on input from an acoustic sensor equipped to the aircraft.

In certain aspects, the structured light source is an LED or laser light source.

In certain aspects, the structured light source is a laser light source configured to generate light with a wavelength in the 450-495 nm light spectrum.

In certain aspects, the stereo-vision system includes a 450 nm bandpass filter.

In certain aspects, the structured light source is a laser light source configured to generate light with a wavelength in the blue light spectrum.

In certain aspects, the stereo-vision system includes a blue bandpass filter.

In certain aspects, the mirror is an electro-mechanical systems (MEMS) mirror.

In certain aspects, the processor is configured to control each of the mirror position, the first camera, and the second camera based at least in part on the position data from the IMU.

DRAWINGS

The foregoing and other objects, features, and advantages of the devices, systems, and methods described herein will be apparent from the following description of particular embodiments thereof, as illustrated in the accompanying figures, where like reference numbers refer to like structures. The figures are not necessarily to scale, emphasis instead is being placed upon illustrating the principles of the devices, systems, and methods described herein.

FIG. 8 illustrates an example virtual reality simulation system.

FIG. 9a illustrates an example real world space as captured by the defensive UAV's sensor payload.

DETAILED DESCRIPTION

Figure 1:
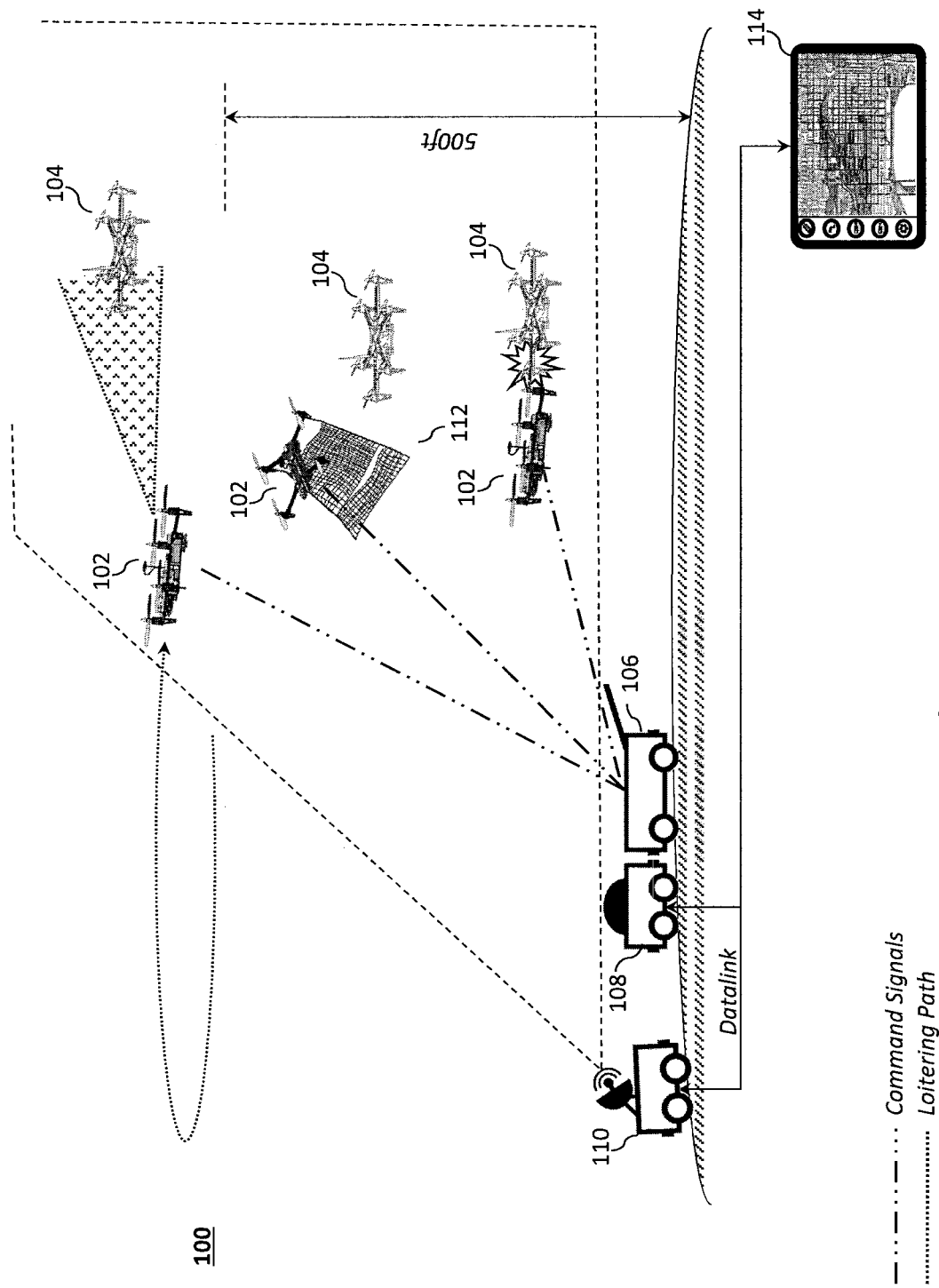
FIG. 1 illustrates an example aerial defense system.

Preferred embodiments of the present invention will be described hereinbelow with reference to the accompanying drawings. The components in the drawings are not necessarily drawn to scale, the emphasis instead being placed upon clearly illustrating the principles of the present embodiments. For instance, the size of an element may be exaggerated for clarity and convenience of description. Moreover, wherever possible, the same reference numbers are used throughout the drawings to refer to the same or like elements of an embodiment. In the following description, well-known functions or constructions are not described in detail because they may obscure the invention in unnecessary detail. No language in the specification should be construed as indicating any unclaimed element as essential to the practice of the embodiments.

Recitation of ranges of values herein are not intended to be limiting, referring instead individually to any and all values falling within the range, unless otherwise indicated herein, and each separate value within such a range is incorporated into the specification as if it were individually recited herein. The words "about," "approximately," or the like, when accompanying a numerical value, are to be construed as indicating a deviation as would be appreciated by one of ordinary skill in the art to operate satisfactorily for an intended purpose. Ranges of values and/or numeric values are provided herein as examples only, and do not constitute a limitation on the scope of the described embodiments. The use of any examples, or exemplary language ("e.g.," "such as," or the like) provided herein, is intended merely to better illuminate the embodiments and does not pose a limitation on the scope of the embodiments. No language in the specification should be construed as indicating any unclaimed element as essential to the practice of the embodiments.

In the following description, it is understood that terms such as "first," "second," "top," "bottom," "side," "front," "back," and the like, are words of convenience and are not to be construed as limiting terms. The various data values (e.g., voltages, seconds, etc.) provided herein may be substituted with one or more other predetermined data values and, therefore, should not be viewed limiting, but rather, exemplary. For this disclosure, the following terms and definitions shall apply:

The terms "aerial vehicle" and "aircraft" refer to a machine capable of flight, including, but not limited to, fixed wing aircraft, unmanned aerial vehicles (UAVs), variable wing aircraft, and vertical take-off and landing (VTOL) aircraft.

The term "and/or" means any one or more of the items in the list joined by "and/or". As an example, "x and/or y" means any element of the three-element set {(x), (y), (x, y)}. In other words, "x and/or y" means "one or both of x and y". As another example, "x, y, and/or z" means any element of the seven-element set {(x), (y), (z), (x, y), (x, z), (y, z), (x, y, z)}. In other words, "x, y, and/or z" means "one or more of x, y, and z."

The terms "circuits" and "circuitry" refer to physical electronic components (e.g., hardware) and any software and/or firmware ("code") which may configure the hardware, be executed by the hardware, and or otherwise be associated with the hardware. As used herein, for example, a particular processor and memory may comprise a first "circuit" when executing a first set of one or more lines of code and may comprise a second "circuit" when executing a second set of one or more lines of code. As utilized herein, circuitry is "operable" to perform a function whenever the circuitry comprises the necessary hardware and code (if any is necessary) to perform the function, regardless of whether performance of the function is disabled, or not enabled (e.g., by a user-configurable setting, factory trim, etc.).

The terms "communicate" and "communicating" as used herein, include both conveying data from a source to a destination and delivering data to a communications medium, system, channel, network, device, wire, cable, fiber, circuit, and/or link to be conveyed to a destination. The term "communication" as used herein means data so conveyed or delivered. The term "communications" as used herein includes one or more of a communications medium, system, channel, network, device, wire, cable, fiber, circuit, and/or link.

The terms "coupled," "coupled to," and "coupled with" as used herein, each mean a relationship between or among two or more devices, apparatuses, files, circuits, elements, functions, operations, processes, programs, media, components, networks, systems, subsystems, and/or means, constituting any one or more of: (i) a connection, whether direct or through one or more other devices, apparatuses, files, circuits, elements, functions, operations, processes, programs, media, components, networks, systems, subsystems, or means; (ii) a communications relationship, whether direct or through one or more other devices, apparatuses, files, circuits, elements, functions, operations, processes, programs, media, components, networks, systems, subsystems, or means; and/or (iii) a functional relationship in which the operation of any one or more devices, apparatuses, files, circuits, elements, functions, operations, processes, programs, media, components, networks, systems, subsystems, or means depends, in whole or in part, on the operation of any one or more others thereof.

The term "data" as used herein means any indicia, signals, marks, symbols, domains, symbol sets, representations, and any other physical form or forms representing information, whether permanent or temporary, whether visible, audible, acoustic, electric, magnetic, electromagnetic, or otherwise manifested. The term "data" is used to represent predetermined information in one physical form, encompassing any and all representations of corresponding information in a different physical form or forms.

The term "database" as used herein means an organized body of related data, regardless of the manner in which the data or the organized body thereof is represented. For example, the organized body of related data may be in the form of one or more of a table, map, grid, packet, datagram, frame, file, email, message, document, report, list, or in any other form.

The term "exemplary" means "serving as an example, instance, or illustration." The embodiments described herein are not limiting, but rather are exemplary only. It should be understood that the described embodiments are not necessarily to be construed as preferred or advantageous over other embodiments. Moreover, the terms "embodiments of the invention," "embodiments," or "invention" do not require that all embodiments of the invention include the discussed feature, advantage, or mode of operation.

The term "memory device" means computer hardware or circuitry to store information for use by a processor. The memory device can be any suitable type of computer memory or any other type of electronic storage medium, such as, for example, read-only memory (ROM), random access memory (RAM), cache memory, compact disc read-only memory (CDROM), electro-optical memory, magneto-optical memory, programmable read-only memory (PROM), erasable programmable read-only memory (EPROM), electrically-erasable programmable read-only memory (EEPROM), a computer-readable medium, or the like.

The term "network" as used herein includes both networks and inter-networks of all kinds, including the Internet, and is not limited to any particular network or inter-network.

The term "processor" means processing devices, apparatuses, programs, circuits, components, systems, and subsystems, whether implemented in hardware, tangibly embodied software, or both, and whether or not it is programmable. The term "processor" includes, but is not limited to, one or more computing devices, hardwired circuits, signal-modifying devices and systems, devices and machines for controlling systems, central processing units, programmable devices and systems, field-programmable gate arrays, application-specific integrated circuits, systems on a chip, systems comprising discrete elements and/or circuits, state machines, virtual machines, data processors, processing facilities, and combinations of any of the foregoing. The processor may be, for example, any type of general purpose microprocessor or microcontroller, a digital signal processing (DSP) processor, an application-specific integrated circuit (ASIC). The processor may be coupled to, or integrated with, a memory device.

Disclosed herein is an aerial system to intercept a target object, such as a target aircraft. In one aspect, the aerial system may employ one or more modified low cost commercial off-the-shelf (COTS) aircraft (e.g., UAVs) to attack a target aircraft. For example, a COTS UAV may be transformed into a defensive aircraft (e.g., an interceptor aircraft) through installation of an improved communication and sensor payload and/or one or more target neutralization devices.

An objective of the disclosed aerial defense system is to approach parity between the cost of the defensive aircraft and the target aircraft through a loaded-and-ready storage and launch system having multiple defensive aircraft. As will be disclosed, the aerial defense system's storage and launch unit may be light and simple enough to be deployed to (or from), for example, a combat outpost (COP), a remote main operating base (MOB), and/or a forward operating base (FOB). A low-cost approach has historically been considered too risky; however the disclosed aerial defense system's modular infrastructure (e.g., flight controls, homing system, algorithms and hardware for steering and homing, communication with a tracking system, human machine interface device, etc.) permits portability and upgradability, thereby enabling future use with higher-capability vehicles and flight hardware, while allowing for component upgrade and replacement. Moreover, the disclosed aerial defense system may be platform agnostic. Thus, as the threats become higher speed and more maneuverable, the defensive UAVs may be correspondingly upgraded, while the infrastructure would not be rendered obsolete. For example, the various defense systems may be reused, such as the tracking system, the algorithms, the hardware for steering and homing the defensive aircraft, and the human machine interface(s). While the subject disclosure is generally described in terms of aerial defense, the subject disclosure may be used with virtually any COTS aircraft (e.g., drones) to make it capable of communicating with existing national defense systems, whether for this specific mission or any other mission (e.g., through three-dimensional (3D) mapping of territory by USAID, relief mission after a tsunami, etc.).

In certain aspects, the disclosed aerial defense system may incorporate systems and methods to perform virtual reality hardware in-loop sensor simulations. The various techniques for testing and validating need not be limited to drone defense, but rather, may be employed with a lot of different systems. For example, the aerial system may facilitate virtual (or augmented) reality, in-flight testing of navigation and control algorithms using a real defensive UAV. As will be discussed, the virtual reality system may generate an aerial simulation environment using, for example, both real world inputs and simulated inputs (e.g., from a virtual/augmented reality simulation system). That is, a physical defensive UAV may be operated (e.g., flown) in a real world environment, while receiving simulated sensor feedback inputs from a virtual world. The virtual world can be generated via one or more remotely situated high-end graphics processors operatively coupled with a non-transitory memory device having software embodied thereon. In operation, the aerial simulation environment may provide real-time performance using virtual or augmented reality software and hardware, which can be tightly coupled with the actual, measured position of the defensive aircraft. The actual position may be determined in real-time or near real-time using onboard global positioning system (GPS) and/or inertial navigation system (INS) systems. In certain aspects, a real-time kinematic (RTK) GPS may be used to test the defensive aircraft under different operating conditions.

The disclosed aerial defense system offers a number of advantages over prior solutions. For example, where cost is a concern, an advantage of the system aerial defense system is its low cost, which can be achieved through, inter alfa, its COTS aircraft baseline structure. Further, the ability to more effectively and cheaply scale up the aerial defense system may be accomplished because the most expensive components (e.g., the targeting system, radio, thermal/battery maintenance hardware and software) need not be repeated on a per-defensive aircraft basis—rather, they need only be repeated on a per aerial defense system basis. In certain aspects, the aerial defense system may also employ a portable storage system design that is scalable and amenable to many co-located or stacked components. Where VTOL defensive aircraft are used, deployment is extremely low cost compared to other solutions, which often require a powerful device to accelerate an aircraft (e.g., a tube-launched aircraft) to flight velocity. For example, using COTS VTOL racing drones as the baseline vehicle is more effective than current tube-launched solutions. The use of an onboard camera-based targeting system and an onboard target neutralization device allow a low-cost system to achieve accuracies similar to much more costly solutions. Other combinations of COTS sensors, including both active (e.g., radar or LiDAR) and passive (e.g., infrared, acoustic, etc.) sensors may also fulfill the concept of a localizing sensor to address improvement in accuracy over the ground-based system that guides the vehicle into the vicinity of the target.

FIG. 1 illustrates an example aerial defense system 100, which may provide both day and night defense operation capability. The aerial defense system 100 enables a low cost, COTS-based small unmanned aerial system (SUAS) approach to aircraft defense that has both a near-term realization and the ability to transition to more capable vehicles as threat capabilities increase (e.g., higher speed, acceleration, and altitude). The aerial defense system's 100 primary components may be generally divided into three subsystems: (1) an onboard modular intercept drone avionics set (MIDAS) to provide flight control, homing, and communication; (2) a human machine interface (HMI) device 114 to provide operator interaction; and (3) ground- or sea-based airframe, defeat, and launch components. The various subsystems are each described in greater detail below. The aerial defense system's 100 airframe, defeat, and launch components may include, or be compatible with, a counter rocket, artillery, and mortar (C-RAM) command and control (C2) system 110 to enable immediate integration with existing military defense systems. The C-RAM C2 system 110 provides a sensor suite to detect and provide an early warning of incoming artillery, rockets, and mortar rounds in the air before they hit their ground targets. As illustrated, the aerial defense system 100 generally comprises one or more defensive UAV 102 (e.g., a VTOL UAV, or another aircraft), a HMI device 114, and the airframe, defeat, and launch components, which generally includes one or more aircraft (e.g., UAV) storage systems 106 and a ground based aircraft (e.g., UAV) controller 108 in communication with the C-RAM C2 system 110. As illustrated, the airframe, defeat, and launch components may be mounted to a portable platform (e.g., a wheeled base) or stationary.

The aerial defense system 100 may perform a range of functions that collectively operate as a high-level system with which the C-RAM C2 system 110 (or another targeting system) communicates. That is, commands from the C-RAM C2 system 110 can be integrated with the airframe, defeat, and launch components as inputs via one or more wireless radios. Based at least in part on these commands, protocols can be followed to prepare, arm, and (when a threat is detected) launch the defensive UAV 102 (e.g., from a UAV storage system 106) in response to signals (e.g., C2 signals) from the C-RAM C2 system 110. In certain aspects, a lightweight counter mortar radar (LCMR) (e.g., AN/TPQ-49 or 50) may be used to provide the threat tracking in lieu of the C-RAM C2 system 110. Command and control could also come from an operator on the ground, where the operator provides targeting information based on line-of-sight observations of the target, a hand-held targeting device, or other means to estimate the position, heading, and speed of the target. In each of these cases, communication between C-RAM C2 or other system 110 and the aerial defense system 100 may be performed using a military-band radio set (e.g., Rajant radio, which is similar to a R05010-Radar Data Transfer System AN/TSC). Alternatively, an operator could fly the vehicle manually to within the range necessary for other on-board systems to detect and localize the target vehicle.

The various components of the aerial defense system 100 each offer unique capabilities that work in concert in an integrated fashion to ensure an effective low-cost solution. The defensive UAVs 102, which may be housed in the UAV storage system 106, can be maintained and updated through the UAV controller 108. The UAV controller 108, which facilitates aircraft management and communication, may be connected to the defensive UAVs 102 through power connections (e.g., cables, contacts, wireless charging, etc.) and wired/wireless data links. The UAV controller 108 may be separate from, or integrated with, the UAV storage system 106. Each defensive UAV 102 may contain on-board systems and a radio to communicate with a targeting system (e.g., the C-RAM C2 system 110) either directly or through an intermediate/relay device (e.g., the UAV controller 108 and/or HMI device 114). For example, the UAV controller 108 and/or HMI device 114 may serve to provide reception and relay functionality. In certain aspects, the HMI device 114 may provide one or more software components (e.g., applications) via a standard tablet or cell phone, which provides simple initialization and arming commands, and receives status information and alerts from both the defensive UAVs 102 and the UAV controller 108. The HMI device 114 may also serve as a direct control mechanism to fly the defensive UAV 102 toward the target.

When desired, the defensive UAV 102 may use low-cost on board COTS components, such as a low-cost radio for communicating with ground equipment (e.g., the UAV storage system 106/UAV controller 108) a low-cost camera for targeting a target aircraft 104. Indeed, the radio can be communicatively coupled with the UAV controller 108, which keeps the temperature, battery charge, battery temperature, and overall health of each of the defensive UAV 102 regulated, while relaying command and control signals from the targeting system (e.g., via higher cost radios) to all the defensive UAVs 102 in the aerial defense system 100; thereby enabling multiple vehicle targeting while keeping the cost of the overall aerial defense system 100 to a minimum. The UAV storage system 106 provides for manageable, positive interconnection between the launch and ground portions of the system, protects and integrate all the components, and provides for a trouble-free and reliable launch. The HMI device 114 provides connectivity to the functionality and eases setup, long-term health monitoring, and post-launch decisions (this last being optional). Although low-cost components and approaches are favored, they are not necessary where higher quality or military-specified components are needed or desired.

Defensive UAV 102. The aerial defense system 100 enables a low-cost, modular, avionics set or kit to adapt to a variety of COTS UAV, transforming them into defensive UAVs 102. A modular intercept drone avionics set (MIDAS) can be used to transform virtually any COTS UAV into a defensive UAV 102. Reducing the cost of the modifications required to convert the COTS UAV into a defensive UAV 102 may be accomplished through the use of high frame-rate cameras (and associated embedded software) and the use of a very low-cost radio communicating with a more centralized, more costly system designed to communicate with existing targeting systems. For example, the aerial defense system 100 may employ two or more defensive UAVs 102, each modified with improved flight control laws, a specialized targeting camera, a target neutralization device, and a low-latency radio. The defensive UAVs 102 may also include upgrades to the GPS and inertial components.

As can be appreciated, first-person view (FPV) UAVs are very small, low cost, and maneuverable. The weight of the on-board MIDAS system should therefore be lightweight (e.g., <100 g,) to enable compatibility with FPV racers and other small UAVs. FPV UAVs, for example, may be outfitted to achieve climb rates of 10,000 ft/min, speeds up to 120 knots, and thrust/weights >4 (4 g maneuvering). By modifying these UAVs to include, inter alfa, a camera-based targeting system, and by upgrading their flight control systems/software, the UAVs can be converted into defensive UAVs 102 with the ability to either impact or come within a very short distance (<0.5 m) of a typical off-the-shelf drone.

In operation, the defensive UAV 102 may receive commands from a C-RAM C2 system 110 (e.g., either directly or indirectly via the UAV controller 108 or the HMI device 114), maneuver toward the detected threat (e.g., a target aircraft 104), and engage the threat via one of a plurality of guidance techniques. Example guidance techniques include a fast-response collision mode that provides a quick-response first-pass at high closure rate and a trailing (chase) mode, similar to dogfighting, which provides a longer time period for the weapon to be trained on the target aircraft 104 and carry out a strafing pass. As used herein, the term strafing refers to either firing a single or multiple rounds of the weapon at the target, from a moving base (e.g., an aircraft) and taking into account the relative motion of the target (e.g., 'leading' the target so that a direct hit is ensured. In certain aspects, the defensive UAV 102 may incorporate a pilot hand-off and take-over capability using, for example, a remote controller 232. The defensive UAVs 102 may be retained in the UAV storage system 106 in a ready state, and when signaled (e.g., by the C-RAM C2 system 110), perform an intercept maneuver to come within close range of the target.

Figure 2A:
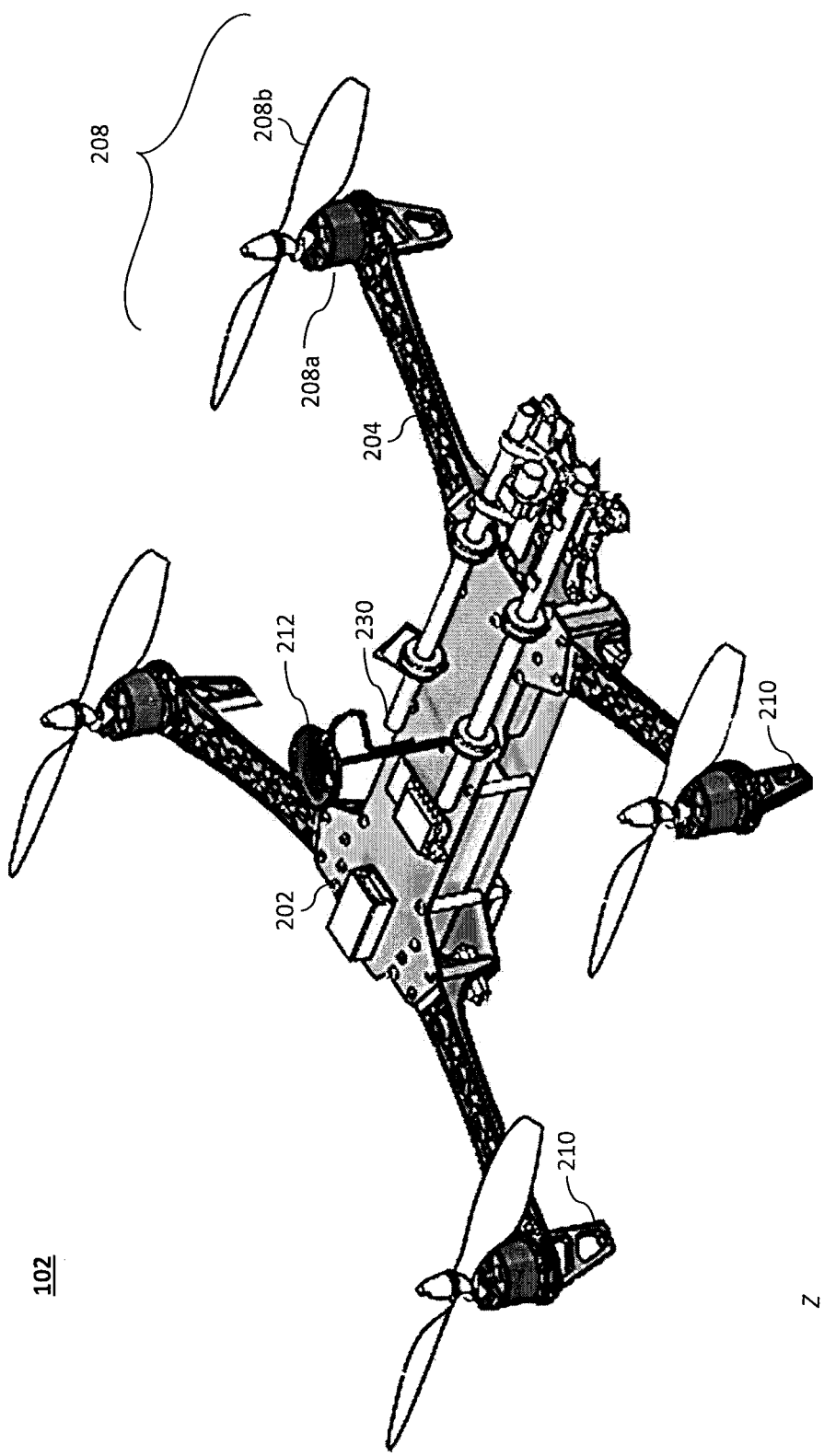
FIGS. 2a through 2c illustrate an example multi-rotor vertical take-off and landing (VTOL) defensive UAV.
Figure 2C:
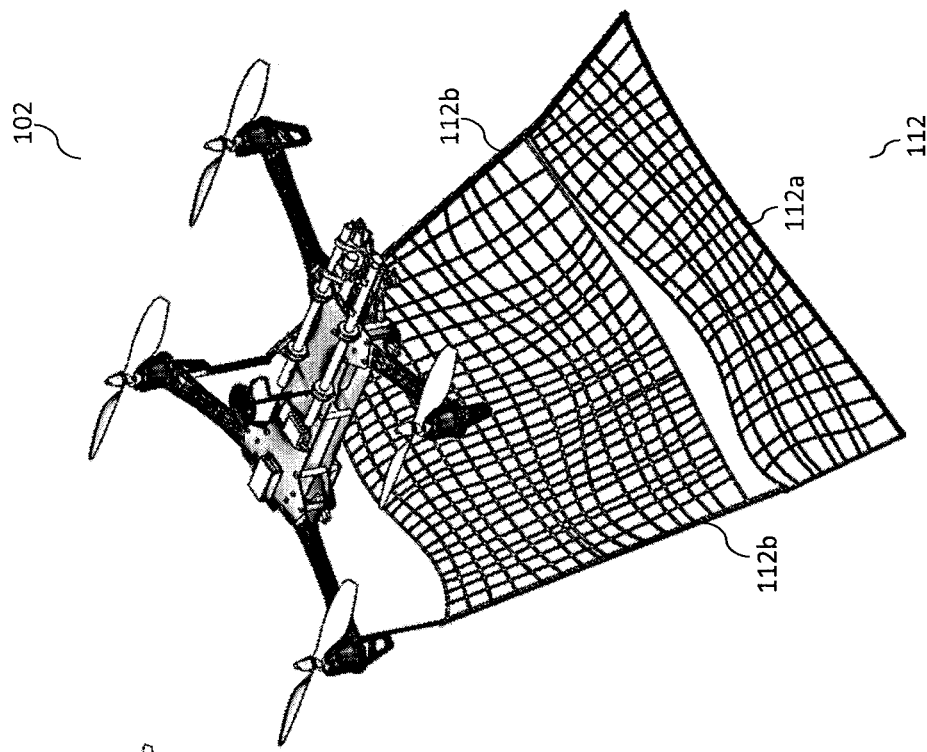
Figure 2B:
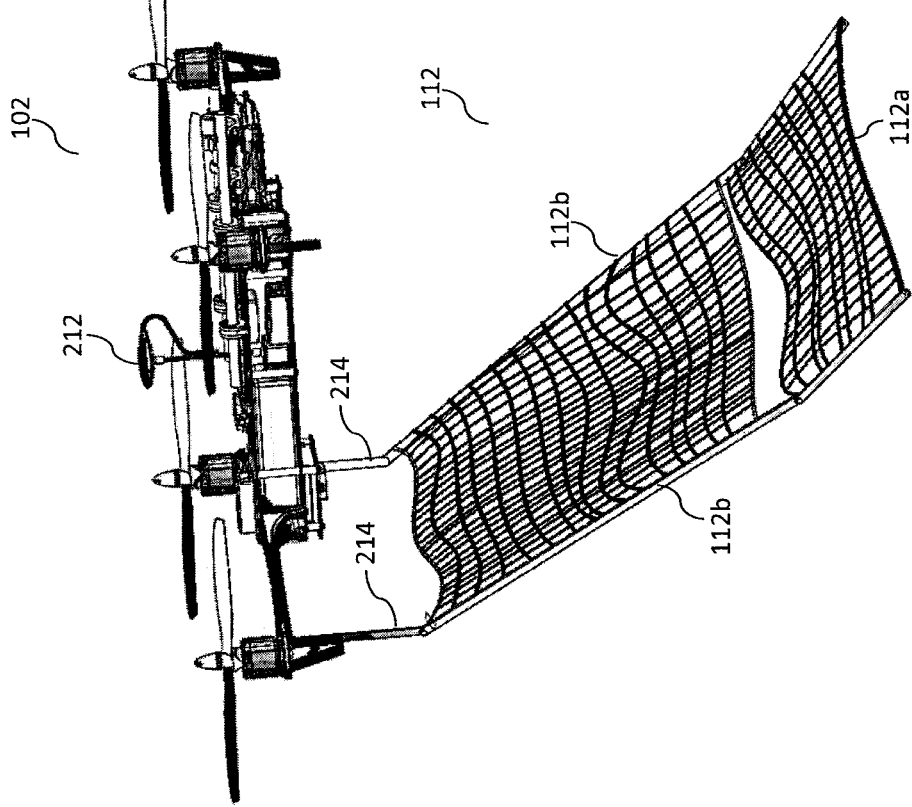

A suitable aircraft for use with an aerial defense system 100 includes the multi-rotor defensive UAV 102 illustrated in FIGS. 2a through 2c. As illustrated, the defensive UAV 102 generally comprises an airframe 202 (e.g., a fuselage or other structure), a plurality of rotor booms 204 (e.g., longitudinal booms) extending from each corner and/or radially from the airframe 202, landing gear 210, and a plurality of propulsors 208. The posts of landing gear 210 and the plurality of rotor booms 204 may be fabricated as a singular unit, or as separate components to be coupled to one another. While a multi-rotor VTOL UAV is illustrated throughout the figures, the teachings of the present disclosure may similarly be applied to other aircraft, including, inter alfa, fixed wing, rotary wing, multi-rotor, or the like.

The airframe 202 may be coupled with a proximal end of each of the plurality of rotor booms 204 such that the distal ends of the plurality of rotor booms 204 extend substantially radially from the airframe 202. The airframe 202 and the plurality of rotor booms 204 may be fabricated as a singular unit, or as separate components to be coupled to one another. The distal end of each of the plurality of rotor booms 204 may be coupled with a propulsor 208, each of which is illustrated as a lift motor 208a coupled to, and configured to drive/rotate, a propeller 208b. Each of said plurality of propulsors 208 is placed at a distal end of a rotor boom 204 and oriented to direct thrust downward (relative to the airframe 202). The lift motor 208a may be an electric motor controlled via an electronic speed controller (ESC) 206. To that end, an ESC 206 may also be provided, for example, adjacent the lift motor 208a and integrated (or otherwise coupled) at the distal end of a rotor boom 204. While the defensive UAV 102 is illustrated as having four propulsors 208 (i.e., an quad-rotor aircraft), a person of skill in the art would understand that additional, or fewer, propulsors 208 may be employed to achieve a desired function and depending on, for example, thrust requirements.

Figure 2D:
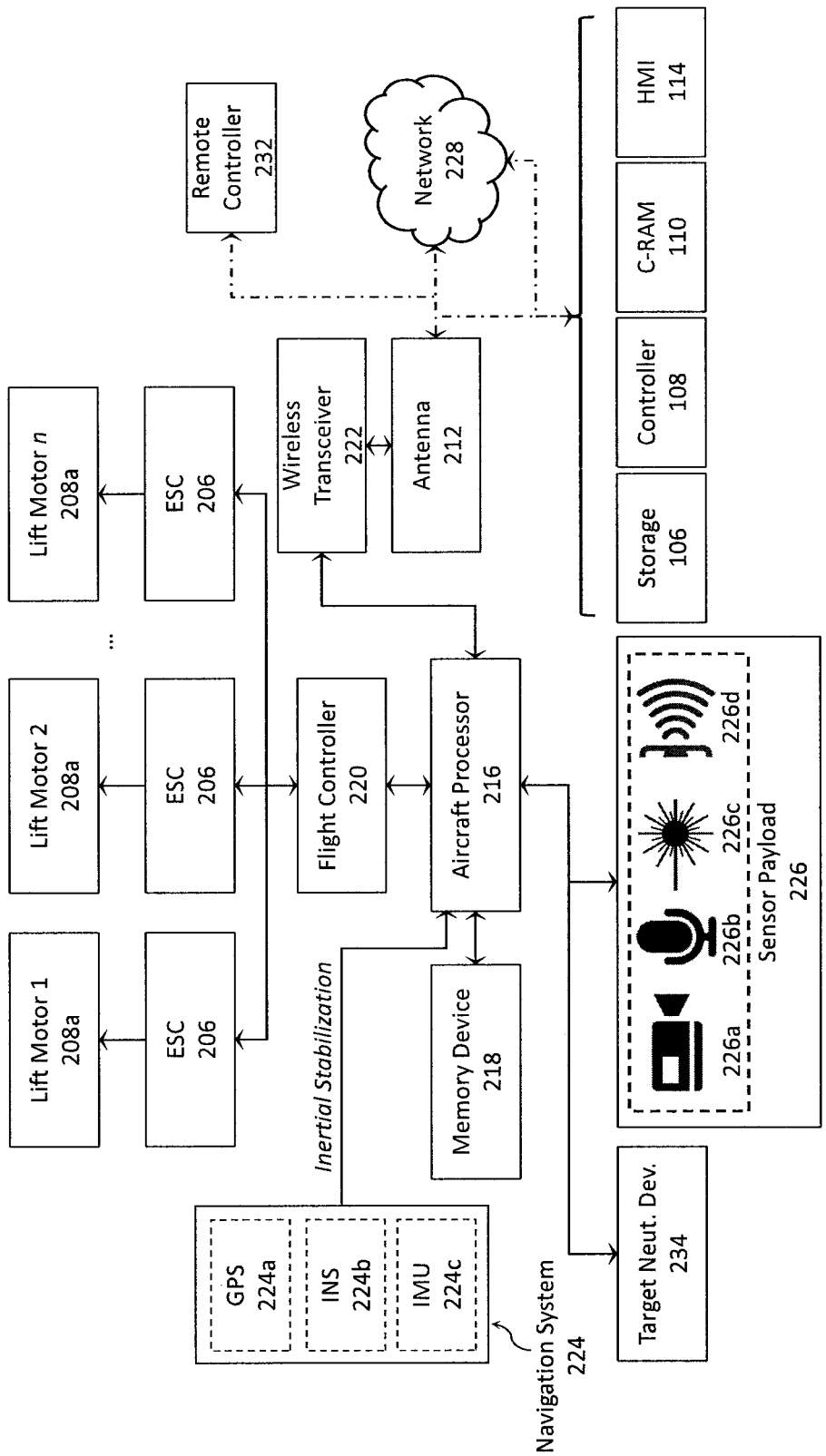
FIG. 2d illustrates a block diagram of an example aircraft control system for the defensive UAV.

FIG. 2d illustrates a block diagram of an example aircraft control system for the defensive UAV 102. The aircraft control system is configured to control the various aircraft components and functions of the defensive UAV 102. As illustrated, the defensive UAV 102 includes one or more aircraft processors 216 communicatively coupled with at least one memory device 218, a flight controller 220, an aircraft wireless transceiver 222 (e.g., where desired, a low cost radio), a navigation system 224, and, where desired, a target neutralization device 234 (e.g., a deployable net 112, a projectile device 230, etc.). The aircraft processor 216 may perform one or more operations based at least in part on instructions (e.g., software) and one or more databases stored to the memory device 218 (e.g., hard drive, flash memory, or the like).

The aircraft wireless transceiver 222 may be coupled with an antenna 212 to communicate data between the defensive UAV 102 and the HMI device 114, another remote device (e.g., portable electronic devices, such as smartphones, tablets, and laptop computers), and/or other controllers (e.g., a base station). For example, the defensive UAV 102 may communicate data (processed data, unprocessed data, etc.) with the remote device (e.g., UAV storage system 106, UAV controller 108, C-RAM C2 system 110, HMI device 114, etc.) directly or indirectly (e.g., over a network 228 or using an intermediate relay device). The remote device(s) may facilitate monitoring and/or control of the defensive UAV 102 and its payload(s), including the sensor payload 226. The aircraft wireless transceiver 222 may communicate using one or more wireless standards such as Bluetooth (e.g., short-wavelength, Ultra-High Frequency (UHF) radio waves in the Industrial, Scientific, and Medical (ISM) band from 2.4 to 2.485 GHz), near-field communication (NFC), Wi-Fi (e.g., Institute of Electrical and Electronics Engineers' (IEEE) 802.11 standards), etc. In certain aspects, the wireless transceiver 222 may wirelessly communicate with a hand-held remote controller 232. For example, where the defensive UAV 102 is within sight of an operator, the operator may wish to assume manual control (or override autopilot) via the remote controller 232.

The aircraft processor 216 may be operatively coupled to the flight controller 220 to control operation of the various actuators (e.g., those to actuate/deploy/release/retract the target neutralization device 234, and those to control movement of any flight surfaces) and/or lift motor 208a (e.g., via ESC 206) in response to commands from an operator, autopilot, a navigation system 224, or other high-level system via the aircraft wireless transceiver 222. In certain aspects, the aircraft processor 216 and the flight controller 220 may be integrated into a single component or circuit. In operation, the flight controller 220 may dynamically (i.e., in real-time or near real-time) and independently adjust thrust from each of the lift motors 208a on each rotor boom 204 during the various stages of flight (e.g., take-off, cruising, landing) via the ESC 206 to control roll, pitch, or yaw of the defensive UAV 102. Specifically, the lift motors 208a may be controlled by adjusting power supplied to each electric motor from a power supply (e.g., a battery pack or a battery bank) via the ESC 206.

Navigation. The aircraft processor 216 may be operatively coupled to the navigation system 224, which may include an GPS 224a that is communicatively coupled with an INS 224b and/or an inertial measurement unit (IMU) 224c to provide position data for the aircraft (e.g., its coordinates, trajectory, bearing, heading, etc.), which can include one or more gyros and accelerometers. The GPS 224a gives an absolute drift-free position value that can be used to reset the INS solution or can be blended with it by use of a mathematical algorithm, such as a Kalman Filter. To test the system, or where the tracked device is cooperative, RTK satellite navigation may be used to enhance the precision of position data derived from satellite-based positioning systems (e.g., GPS/IMU) using measurements of the phase of the signal's carrier wave, rather than the information content of the signal; also known as Carrier-Phase Enhancement. RTK typically relies on a single reference station or interpolated virtual station to provide real-time corrections, thereby resulting in cm level precision. For example, the defensive UAV 102 may be a COTS UAV outfitted with RTK GPS devices to provide absolute position with centimeter (cm) level precision. By utilizing RTK GPS modules mounted on both the target and the defensive UAV 102, information may be gathered on the location of both vehicles during engagements. The same RTK GPS approach may be used on the objective vehicle, and the same type of results will be available. However, we will additionally be able to use MIDAS camera seeker data to determine the vehicle-relative pointing accuracy that can be maintained on the target during collision-course approach, and during trailing mode and/or the chase mode.

Sensor Payload. To collect data and/or monitor an area, the defensive UAV 102 may further be equipped with a sensor payload 226 comprising, for example, one or more cameras 226a (e.g., an optical instrument for recording or capturing images and/or video, including light detection and ranging (LiDAR) devices), audio devices 226b (e.g., microphones, echolocation sensors, etc.), light sources 226c (e.g., a structured light source, such as a laser, and LED light source with SLM (Spatial Light Modulator) or DMD (Digital Micro-mirror Device)), and other sensors 226d to provide sensor data (e.g., photographs, video, audio, sensor measurements, radar measurements, and x-ray measurements, etc.), which may be used to facilitate navigation and, where desired, an intelligence, surveillance, and reconnaissance (ISR) functionality.

The sensor payload 226 is operatively coupled to the aircraft processor 216 to facilitate communication of the sensor data between the sensor payload 226 and the aircraft processor 216. The sensor payload 226 may be rotatably and pivotally coupled to, for example, the underside surface of the airframe 202 (or another structural component, such as the rotor booms 204) via a gimbal system to enable the sensor payload 226 to be more easily oriented downward to monitor objects below and/or on the ground. The data may be dynamically or periodically communicated from the defensive UAV 102 to the remote controller 232 (e.g., HMI device 114) over the network 228 via the aircraft wireless transceiver 222, or stored to the memory device 218 for later access or processing.

The sensor data may be used to navigate the defensive UAV 102. For example, the sensor payload 226 may provide the necessary hardware (e.g., cameras 226a, light sources 226c, etc.) for the below-described camera-based seeker system. The aerial system benefits from improved systems and methods to track aircraft for imaging and targeting. For example, through a camera-based seeker system, the defensive aircraft may use high refresh-rate cameras, manipulation of a light source 304 (e.g., using a reflector/mirror) to scan the field of view (FOV), and stereo-vision to deduce depth in a low cost, light-weight system. Using the IMU 224c, a micro-electro-mechanical systems (MEMS) mirror 306, and fast cameras, extremely fast object tracking on an unsteady platform can be achieved. The camera-based seeker system can be used to perform terminal imaging of a target aircraft 104. Transistor-transistor logic (TTL) line synchronization and inertial measurement unit (IMU) feedback may also be used. Guidance of the defensive aircraft may be achieved using uplinked commands routed through low-cost radios, terminal guidance using vision-based guidance, and overall defensive UAV 102 management and communication, built-in-tests (BIT), etc.

The camera-based seeker system can scan for the target aircraft 104, using a steerable, structured light source 304 (e.g., the light source 226c) that scans to illuminate the defensive UAV 102, wherever it is in the field of view of a binocular pair of cameras. Through a scanning mirror, a very intense light (e.g., a laser) can be directed toward the target aircraft 104, locking on and tracking the target aircraft 104 at very high bandwidth (e.g., about 4-21 kHz). The mirror angle information provides a relative azimuth and elevation to the target, which can be used for terminal guidance of the defensive UAV 102. A set of cameras (e.g., binocular cameras) allow depth to be deduced, to virtually eliminate clutter and aid in terminal guidance. A 450-495 nm (e.g., 450 nm—blue) laser light source 304 and camera bandpass filters (e.g., a 450-495 nm/blue bandpass filter) may be used to maximize performance for both day and night operations. In other words, the wavelength of the filter is preferably matches to the wavelength of the light source. To mitigate overall system cost low, a vision-based homing system may be employed for the terminal engagement (final 20-50 m). The stereo-vision system may be operatively coupled to the processor via a universal serial bus (USB). For example, a USB 3.0 machine vision cameras enable designers to trade resolution for frame rate—the FLIR/Point Grey 5MP camera, for example, can achieve 2448×2048 pixel resolution at 73 fps and 800×600 px at 199 fps. Alternatively, Ximea produces a USB3.0 camera with either 640×400 px @ 1000 fps or 210 fps @ 1280×1024 px. The cameras may be paired with the NVidia Tegra TK1, which allows image processing and homing to be embedded on a general-purpose graphics processing unit (GPU). While targeting is described using a camera, other targeting methods may provide higher accuracy and/or lower cost. For example, other targeting methods may utilize radar or sonar. The targeting described herein may be achieved using low cost radar or sonar with tradeoffs in resolution and/or range (e.g., acoustic, infrared, miniature radar, LiDAR, or laser ranging system.

Figure 3A:
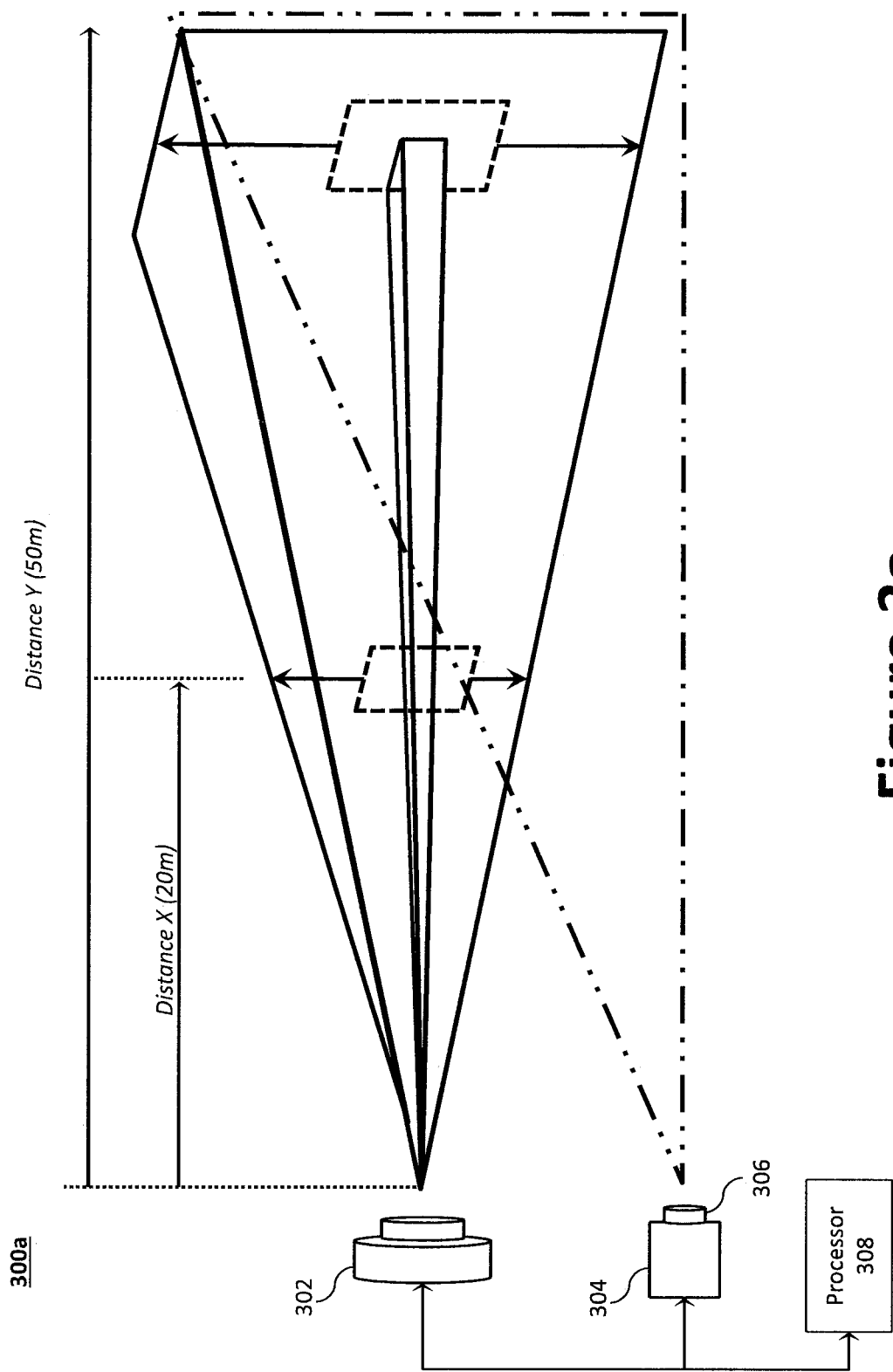
FIGS. 3a and 3b illustrate example camera-based seeker systems.
Figure 3B:
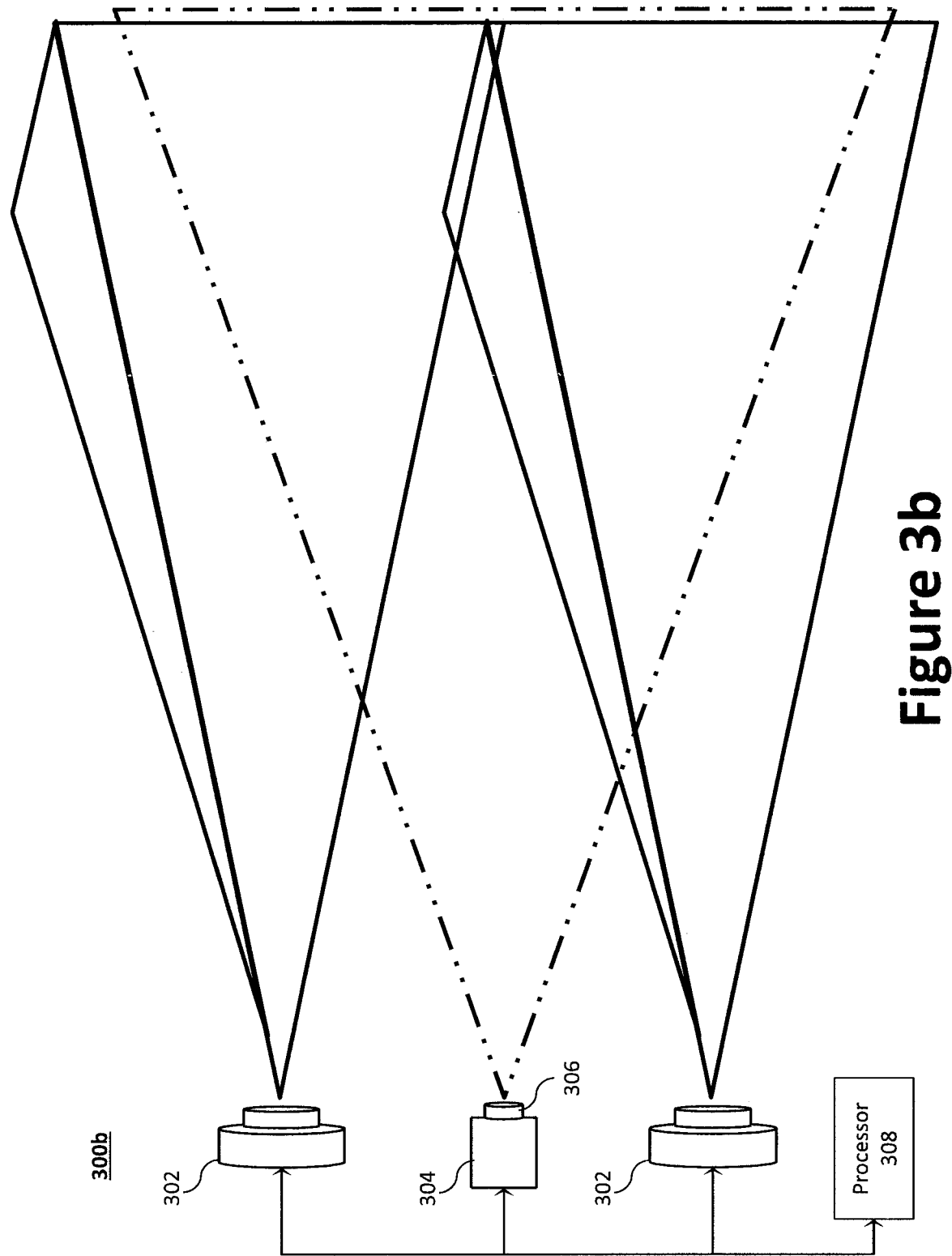

With reference to FIGS. 3a and 3b, the camera-based seeker system may utilize a high frequency imaging system with a MEMS mirror 306 that manipulates the light source 304 to move in a certain region and an imager that captures that specific region in 3D volume. For example, the MEMS mirror 306 may facilitate optical beam-steering (or 2D optical scanning) using scanning two axis (e.g., tip-tilt) microscopically small mirrors controlled by MEMS, where their states are controlled by applying a voltage between the two electrodes around the mirror arrays. FIG. 3a illustrates a camera-based seeker system 300a having a single camera 302 and a light source 304, while FIG. 3b illustrates a camera-based seeker system 300b having two cameras 302 (stereo-vision) and a light source 304. A 3D position can also be determined using a single camera and the MEMS mirror;

however, accuracy improves when the target is within the triple intersection region of the two cameras and the MEMS mirror. While the light source 304 will be generally described as a laser, other light sources are contemplated; such as one or more light emitting diodes (LEDs).

The camera-based seeker system generally includes one or more cameras 302, a light source 304, a MEMS mirror 306, an IMU 224c, and a processor 308 (e.g., the aircraft processor 216 or a dedicated processor). The MEMS mirror 306 controls the angle of the light output from the light source 304 as a function of a mirror position. The IMU 224c, in coordination with the processor 308, controls both the MEMS mirror 306 and two cameras' 302 region of interest. For example, the processor 308 may be configured to adjust the mirror position (e.g., its angle, along one or more axes) of the MEMS mirror 306 to adjust the angle of the light output from the light source 304. Alternative uses of the camera-based seeker system extend beyond scanning for target aircraft, for example, scanning and tracking human or cars on the ground.

The cameras 302 are used to capture images. The camera refresh rate may be greater than 800 Hz, which will enable greater capability for counter-UAS applications as a seeker. A stereo-vision camera system determines the 3D relative position of the target accurately. Therefore, two or more cameras 302 are used to create a stereo-vision setup to detect the 3D position of the target accurately. As illustrated in FIG. 3b, there is overlap between the light source 304 and the two cameras 302. This enables stereo-vision or multi-view calculation of the target's 3D position in space.

An IMU 224c can be used to capture the vehicle dynamics with the imaging system. The IMU 224c provides feedback of the true position of the defensive UAV 102. By incorporating the IMU 224c information, the lighting and imaging is updated at a high refresh rate to predict where the target aircraft 104 will be located relative to the defensive UAV and in the camera FOV at a given time. Since the defensive UAV 102 is constantly moving, the IMU 224c provides feedback of the true position and altitude of the defensive UAV 102 that is accurate for a period of time. This can be used to move the light source 304 beam (by the MEMS mirror 306) and to capture the proper region of interest in the two cameras 302. Manipulating a smaller light beam may be used to accomplish a desired refresh rate (i.e., greater than 800 Hz) during day/night operations; a high frequency MEMS mirror 306 can be used to manipulate a light beam from the light source 304. In certain aspects, a MEMS mirror may be used with an extremely short pulse laser to neutralize targets by burning it up. The lighting is localized to the target object, which should be within the cameras' 302 FOV; this lighting is manipulated by the MEMS mirror 306. Additionally, the light source 304 is manipulated to maximize signal to noise ratio of the captured photons on the imager by performing background removal. The light source 304 may be modulated, for example, with a TTL line synchronized to the camera via the processor 308. This enables the cameras 302 to capture images with the light off as well as images with the light on. By subtracting the two images from each other, one can remove the background and detect changing objects. Traditionally, manipulating the lighting to obtain a high fidelity image did not work well, however, incorporating an IMU 224c to remove background to achieve a high signal-to-noise ratio. Where a powerful light laser is used as the light source 304, the light source 304 (i.e., powerful laser) may also be used to disable a target aircraft 104.

Target neutralization device. To increase the likelihood of disabling the target aircraft 104, the defensive UAVs 102 may be equipped with a target neutralization device to strike the target aircraft 104, such as a deployable net 112, a projectile device 230 (e.g., a gun, projectile launcher, etc.), streamers, a high powered laser, directed-energy weapon (DEW), etc. Using a deployable net 112, for example, to increase the frontal area of the defensive UAV 102 may result in an 85%-95% neutralization success upon contact with a target aircraft 104.

With reference to FIG. 2a, a projectile device 230 may be mounted to the airframe 202 and oriented forward (e.g., to launch a projectile in like the defensive UAV's 102 line of flight). With reference to FIGS. 2b and 2c, a deployable net 112 may further be coupled to the defensive UAV 102 via a pair of stanchions 214 coupled to the underside of the defensive UAV 102. For example, the stanchions 214 may be spaced apart such that each is coupled to the distal end of a rotor boom 204 (as illustrated) or to the underside of the airframe 202. As illustrated, the deployable net 112 generally comprises a net 212a supported by a rigid netting frame 112b. The deployable net 112 may be coupled to the forward end of the defensive UAV 102 and oriented at a reverse angle to capture the target aircraft 104.

Figure 2E:
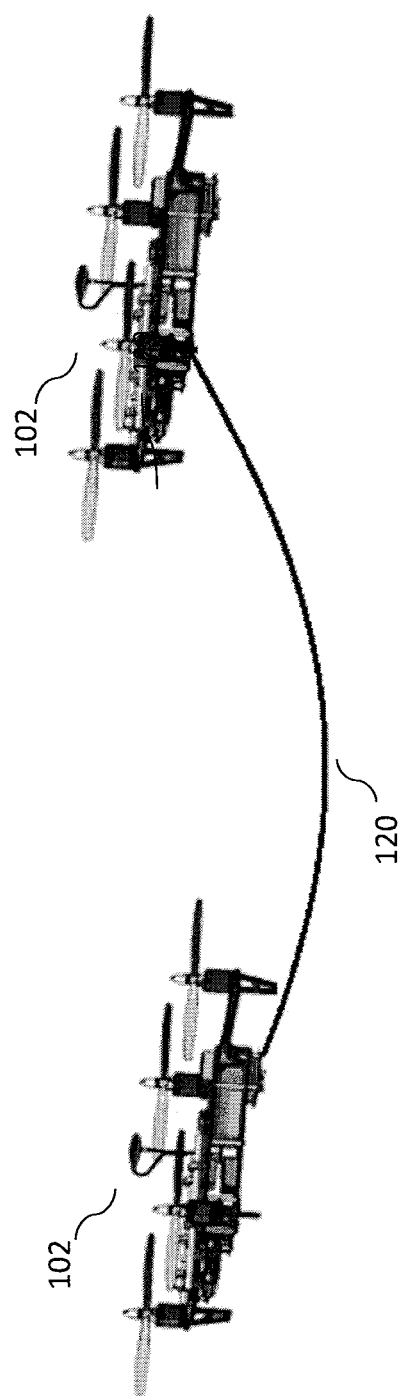
FIGS. 2e through 2g illustrate an example tethered multi-rotor VTOL defensive UAV arrangement.
Figure 2F:
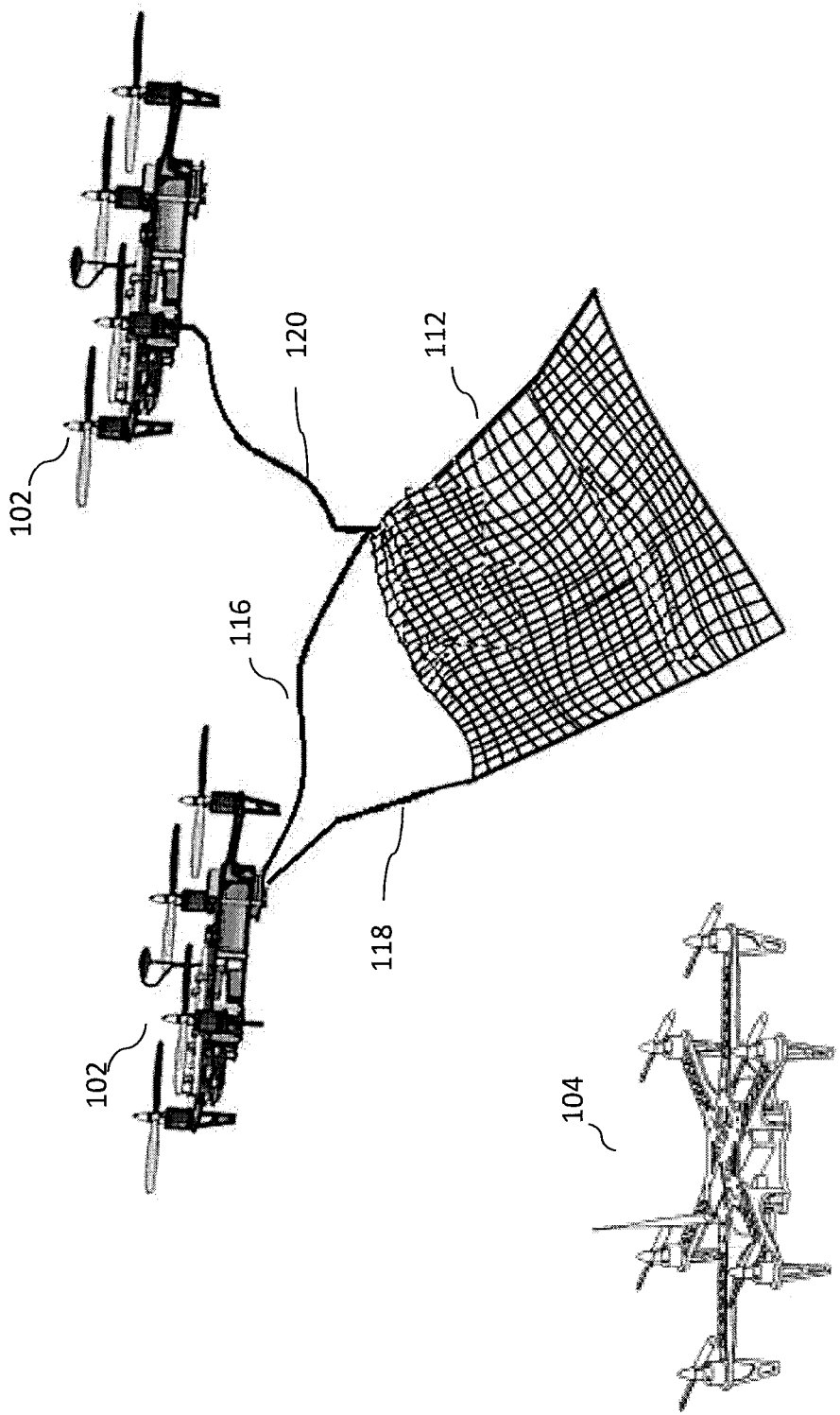

In certain aspects, multiple defensive UAVs may cooperate with one another to engage a detected threat. For example, with reference to FIGS. 2e through 2f, the deployable net 112 may be tethered to multiple aircrafts such that a moment created by the target does not overcome the operability of the defensive UAVs 102. Similarly, the tension of the net may be controlled by the defensive UAVs (flying opposite from one another) at the moment of capture. Specifically, FIG. 2e illustrates a set of defensive UAVs 102 tethered to one another via a tether wire 120, while FIG. 2f illustrate a deployable net 112 coupled to one defensive UAV 102 via the tether wire 120 and to the other defensive UAV 102 via a primary wire 118 and a secondary wire 116. A shock absorbing device may be place at the connection between the net and the UAV. For example, a spring and/or series of pulleys may be used. The net may act like a shrink wrap. A pocket created by the net and the entry becoming closed as the net is pulled away (e.g., drawstrings).

Now turning to FIG. 2e, the aerial defense system 100 may utilize multiple defensive UAVs 102 to capture the target aircraft 104 with the target neutralization device, such as the deployable net 112. By utilizing more than one defensive UAV, the aerial defense system 100 can capture a target aircraft that generates a relatively stronger moment at the point of capture and/or has a relatively heavier weight than the defensive UAV 102.

In some embodiments, the deployable net 112 may be coupled to the aft end of the defensive UAV 102 and oriented at a forward angle to scoop/capture the target aircraft 104 from behind. This capturing strategy is to minimize a resistive force at the point of capture, benefiting from aligning the direction of movement to the target aircraft 104.

Figure 2G:
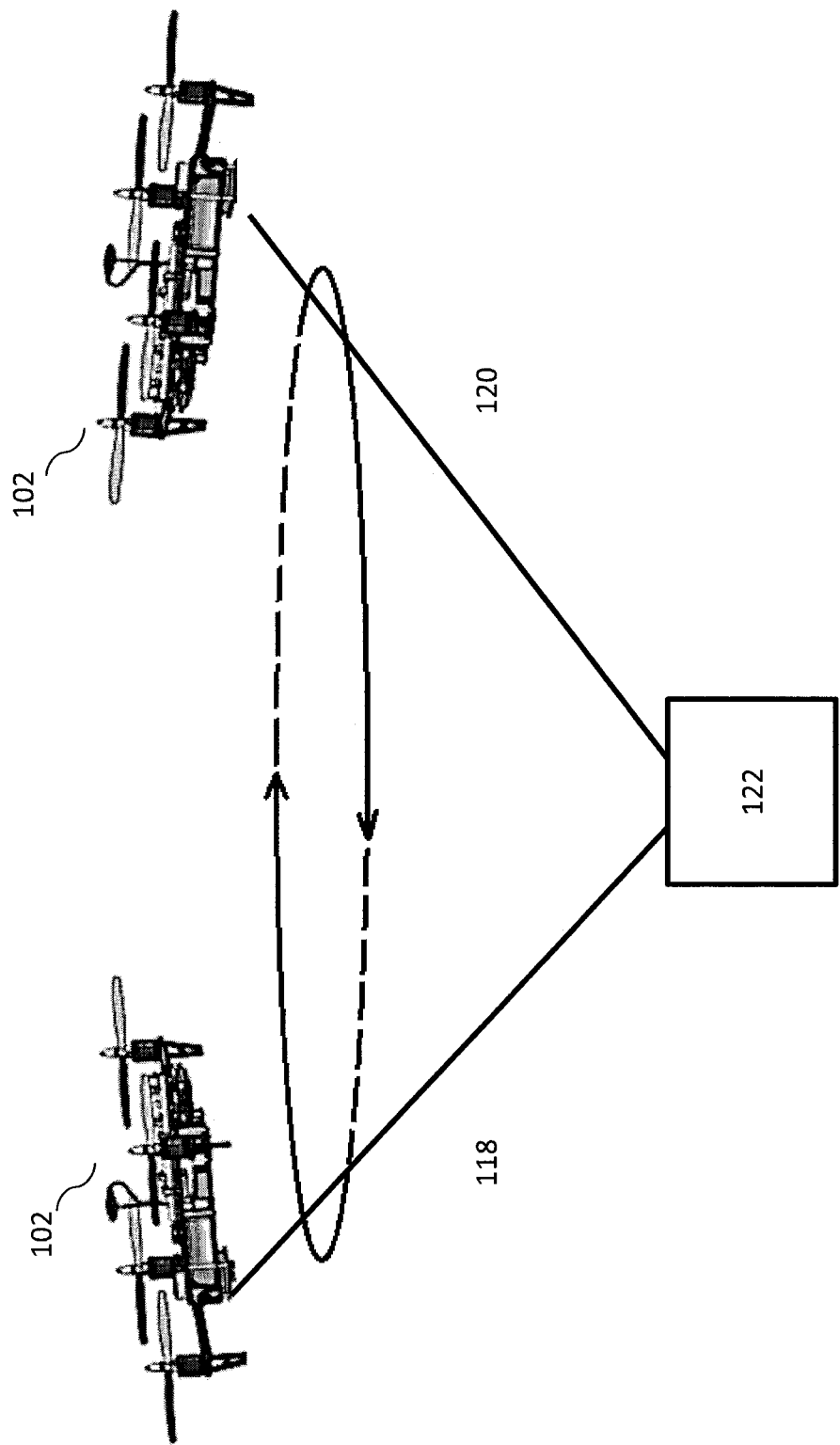

In some embodiments, as shown in FIG. 2e through 2g, a multiple defensive UAVs 102 may work in coordination to capture a target aircraft 104. As such, more aerodynamic forces, such as lift or thrust, may be generated by the multiple defensive UAVs 102. The coordinated capturing method, inter alia, allows for more flexibility in the approach angle when capturing the target aircraft 104. For example, the multiple defensive UAVs 102 may approach at a head-on angle towards the target aircraft 104, while managing the moment generated at capture due to is increased aerodynamic forces.

The multiple defensive UAVs may be tethered by a tether wire 120. Once the deployable net 112 is deployed towards the target aircraft 104 from one of the multiple defensive UAVs 102 (also referred to as the first defensive UAV), the deployable net may be carried by each of the multiple defensive UAVs. The deployable net 112 may be connected to the first defensive UAV by a primary wire 118 and a secondary wire 116. The first defensive UAV may carry the deployable net during pre-deployment of the deployable net 112. As the deployable net 112 is disposed toward the target aircraft 104, the tether wire 120 may extend out with the deployable net 112. FIG. 2f describes the multiple defensive UAVs after the deployable net 112 is disposed towards the target aircraft 104. The secondary wire 116 may be elongated once the deployable net 112 is disposed, such that a minimal tension is sustained by the secondary wire 116. In some embodiments, the secondary wire 116 may be slideably attached to the deployable net 112 to imposed minimal tension along the secondary wire 116. The tethered defensive UAV (hereinafter also referred to as the second defensive UAV) may be attached to the deployable net 112 via the tether wire 120. The deployable net 112 may be carried out by the first defensive UAV 102 and the second defensive UAV 102 collectively, via the primary wire 118 and the tether wire 120 respectively.

The first defensive UAV and the second defensive UAV may loiter in circle as the target aircraft 104 is captured by the deployable net 112 (hereinafter also referred to as payload 122). As the multiple UAVs loiter in a circular pattern, the resulting centrifugal force may partially alleviate tensions along the primary wire 118 and the tether wire 120. In addition, such circular pattern assists in creating lift to the payload 122. The direction of motion of the target aircraft 104 may be detected by the first defensive UAV's on-board sensor payload.

In the case of multiple defensive UAVs—one of the defensive UAV may be a leading UAV. The leading UAV may be equipped with sensor packages for detecting and tracking the target aircraft 104 (thus the leading UAV may weigh more and thrust may be compromised), but other following UAV (i.e., trailing/following aircraft, such as the second defensive UAV) may be equipped with one or more distance sensors to maintain a predetermined distance from the leading UAV, but it may carry less weight in sensor payload, thus may be faster and generate higher thrust. Such that the leading UAV's main object is to detect and target, while the carrying of the deployable net 112 is accomplished by the following UAVs. In addition, the fleet (i.e., the leading and trailing/following UAVs) may be loitering in a predetermined formation and may also be in a predetermined loitering pattern.

The primary wire 118 and/or the tether wire 120 may carry an electric current. By way of example, the secondary wire 116 and/or the tether wire 120 may generate an electric shock to disable the target aircraft 104. The defensive UAV 102 may generate an electric shot delivered to the target aircraft 104 via the conductive wires 118 120 and the conductive deployable net 112. In some embodiments, the deployable net 112 may be minimal in size such that it is designed to make contact with the target aircraft 104 (As such, the deployable net 112 may be any types of latching device, such as a hook. Once the contact is made, a disabling electric shock may be delivered to the target aircraft 104.

With reference to FIG. 2g, when multiple defensive UAVs 102 are used to capture a target aircraft 104, the defensive UAVs may fly in a circular flight path, which reduces disk loading and power required during hover while coupled to a payload 122. For example, the first defensive UAV 102 may capture a target aircraft 104 with a deployable net 112 in a first direction, while the second defensive UAV 102 is tethered to the deployable net 112 and flies towards the object at a second direction. The first and second directions being opposite from one another. The angle between the two flight directions being smaller than 90 degrees. The payload 122 may be, for example, the combination of the target aircraft 104 the deployable net 112.

The deployable net 112 or streamers can be used to intercept and incapacitate an incoming target aircraft 104 when the miss distance is small but would not otherwise result in an impact. Keeping the deployable net 112 with the defensive UAV 102 reduces uncertainty of net location, which may be stowed to reduce drag and error introduced by the net, whereby the net may be deployed about 25 meters or so prior to reaching the target. Therefore, the rigid netting frame 112b may fold, or otherwise collapse, when stowed to reduced drag and the risk of unwanted snagging by the net 112a. The rigid netting frame 112b may employ, for example, first and second longitudinal collapsing/folding linear supports, each of which may be substantially parallel to one another and coupled at its proximal end to a stanchion 214. The distal end of each of the first and second longitudinal collapsing/folding linear supports may be unsecured. Alternatively, where weight is not a concern, the distal ends may be coupled to one another via a third linear support (which may be substantially perpendicular to the first and second supports) to maintain a predetermined distance and/or keep the net taut at the distal end. When in close range to the target aircraft 104, the defensive UAV 102 may optionally deploy (pop-out) the deployable net 112 to increase the frontal area of the defensive UAV 102, thereby increasing the likelihood of striking the target aircraft 104. A deployable net 112 enables multiple passes, either by delaying deployment to a next pass or by retracting after a miss. The deployable net 112 may also be designed to 'break away' from the defensive UAV 102 under the loads induced by capturing and entangling the target; by this method the UAV 102 may be preserved after the engagement and return to its starting point for re-use. Biasing the location to which the defensive UAV 102 steers itself will cause a similar biasing of the circular-probable error (scatter) of the distribution of capture such biasing may be used to increase probability of strike, such as those described by commonly owned U.S. Pat. No. 9,010,683 to Gundlach et al. and titled "Rail Recovery System For Aircraft", which discusses target probability in the context of capturing a wire.

UAV Storage System 106. The UAV storage system 106 houses the defensive UAVs 102 in a long-term state of ready-alert (batteries charged, built-in-test executed on a regular basis, GPS lock maintained, and, heating/cooling, etc.), provides a clean, dry, managed temperature to protect the defensive UAVs 102 from the elements, and facilitates rapid deployment of the defensive UAVs 102 on demand. To enable easy installation and portability at a low cost, portions of the aerial defense system 100 may be configured as a self-contained storage and launch system that is easily set up in the field, able to communicate with C-RAM C2 system 110, is constantly at the ready, and contains a plurality of defensive UAVs 102 (e.g., 2 or more, more preferably 4 or more) with sufficient speed and maneuverability to target a target aircraft 104.

The UAV storage system 106 serves several purposes: (1) it allows for defense against many incoming threats in a conveniently housed, transported, and maintained package; (2) it reduces the cost of the defensive UAVs 102 by housing a single radio for communication with targeting systems (such as the C-RAM C2 system 110) and the various defensive UAVs 102 (the UAV storage system 106 may relay the command and control data to the defensive UAVs 102, which are equipped with a very low-cost radio); (3) it protects the defensive UAVs 102 from the elements until they are needed, maintaining their charge state and keeping them relatively cool and dry; and (4) it provides facilities for automatic launch of the defensive UAVs 102.

The UAV storage system 106 generally comprises a ground station controller 402, a radio 404 coupled to an antenna 408, and a charging system 406 to power the components of the UAV storage system 106 and to charge the defensive UAVs 102. The ground station controller 402 may include, for example, a processor 402a operatively coupled with a memory device 402b. The charging system 406 may include, for example, an internal battery (e.g., lead acid, lithium ion, etc.) operatively coupled with charging circuitry and/or line current (e.g., AC current). In one example, an AC-DC converter may be used to convert AC line current into a DC charging current to charge the internal battery and, when connected, the defensive UAVs 102. In another example, where line current is not available, a DC-DC converter may be used to charge the defensive UAVs 102. In remote locations or where line current is not available, alternatively power supplies may be used to charge the internal battery and the defensive UAVs 102 including, for example, solar panels and/or wind turbines. For example, one or more solar panels or arrays may be provided on a top surface of the UAV storage system 106 and/or adjacent the UAV storage system 106.

The UAV storage system 106 may include integrated features to make the overall defensive system low cost and effective. These include the design of the system to enable effective launch, the use of a container to protect and maintain the charge and temperature of each defensive UAV 102 to prolong its life, and the software for initialization, arming, communication with users through an app, health maintenance and built-in test, and low latency communication and relay of command and control signals.

The UAV storage system 106 may be provided as a ground storage system 106a or suspended storage system 106b, either of which may be portable. The construction and integration details of the UAV storage system 106 can vary, as can the number of defensive UAVs 102 housed. While the ground storage system 106a is illustrated with multi-rotor VTOL defensive UAVs 102, other aircraft types are contemplated. Where a non-VTOL fixed-wing aircraft is employed, for example, a launch system may be used to propel the aircraft to wing-borne speeds. Example launch system devices include, inter alfa, launch rails and a propellant device. The propellant device may be, for example, spring loaded, a $CO_2$ tank coupled to a pneumatic launcher, etc.

Figure 4:
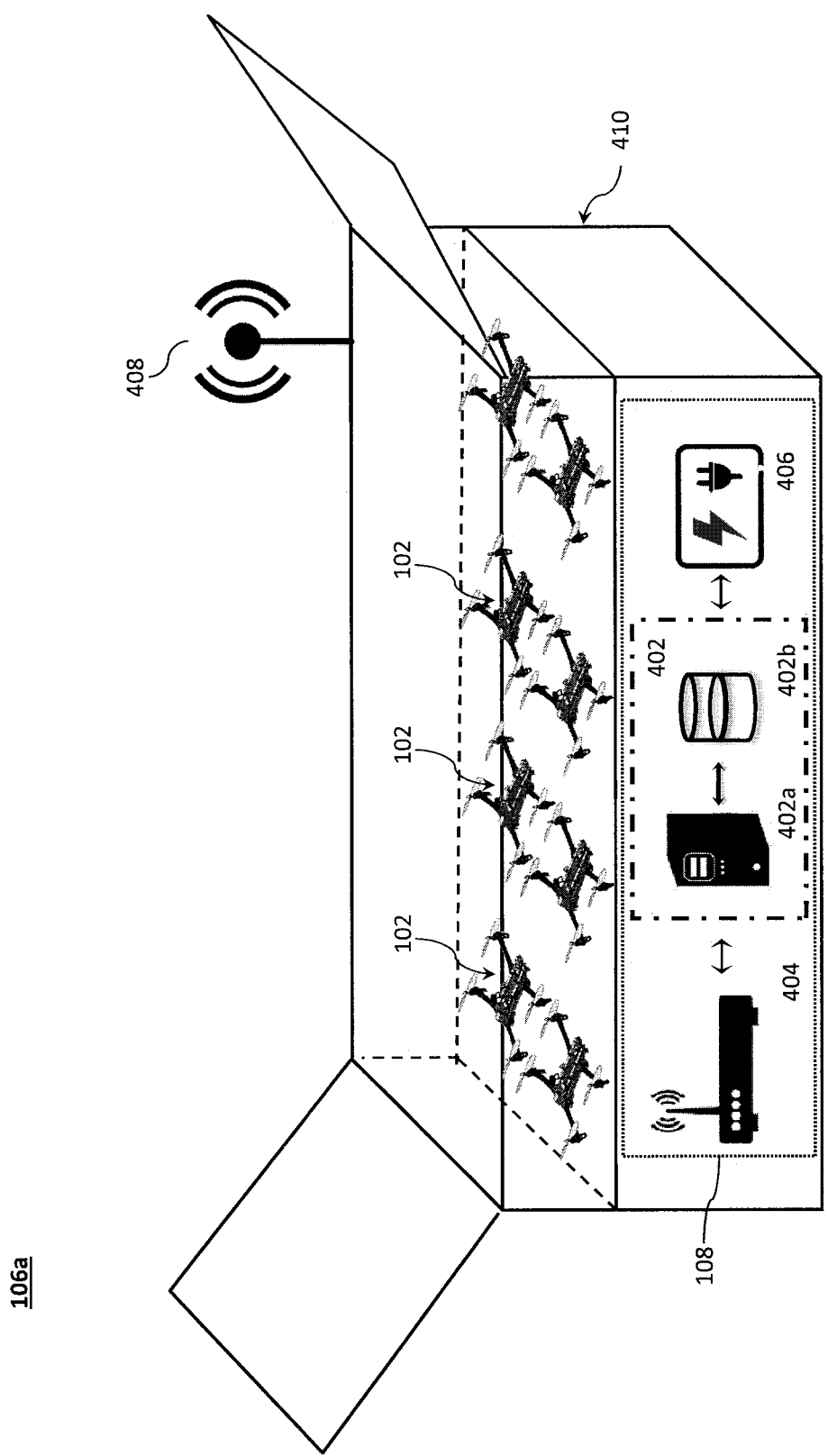
FIG. 4 illustrates an example ground storage system.

Ground Storage System 106a. As illustrated in FIG. 4, the ground storage system 106a may be positioned on the ground and configured with a retractable top (or actuated lid) to allow the defensive UAVs 102 to launch. The components of the aerial defense system 100 may be housed in a portable case 410 (with or without wheels). The portable case 410 may be a Pelican™ case, such as the Pelican™ 0550 available from Pelican Products, Inc., which has interior dimensions of 47.57×24.07×17.68 inches. As can be appreciated, the portable case may be scaled up or down as a function of the number of defensive UAVs 102.

Figure 5A:
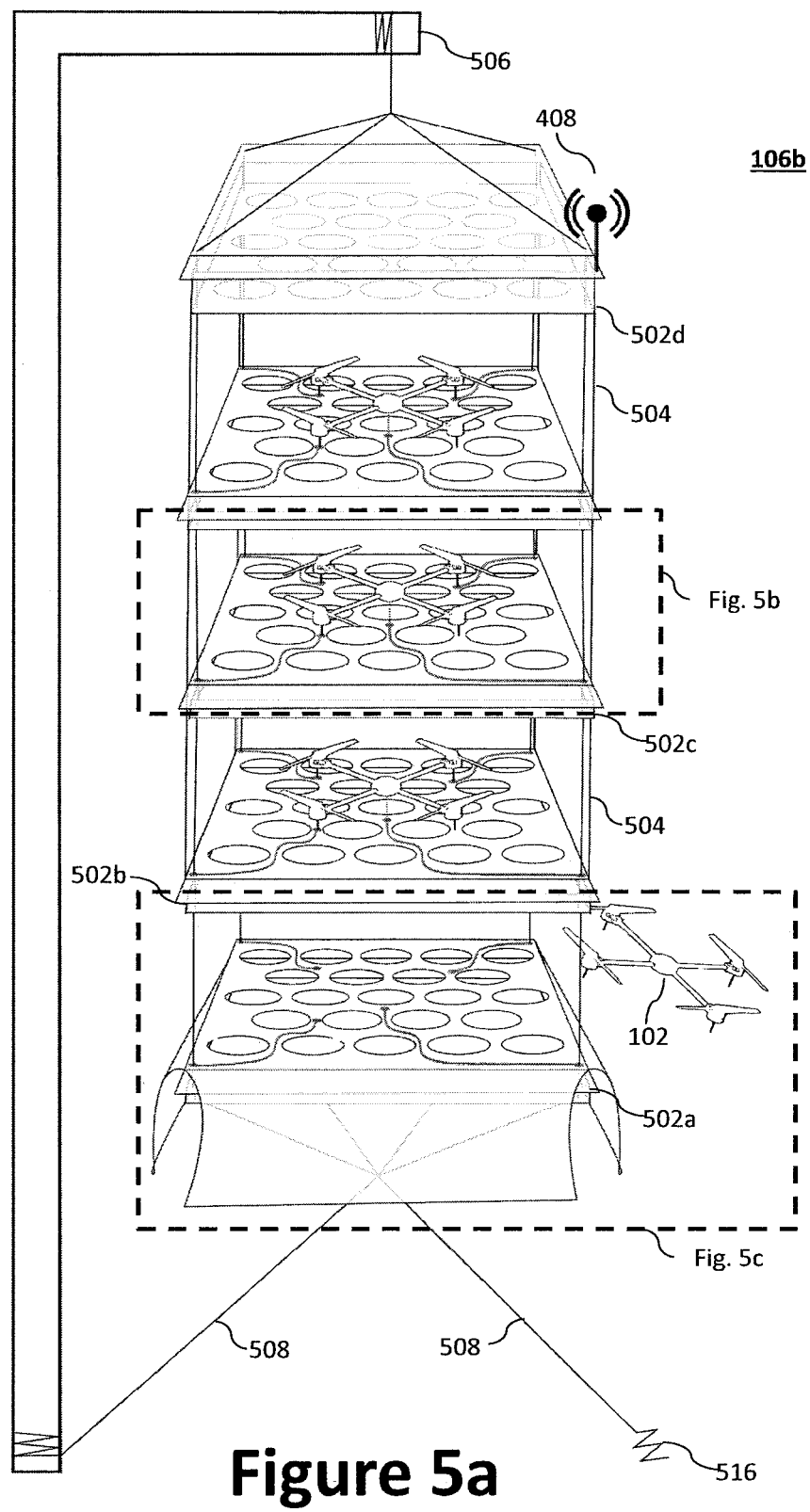
FIGS. 5a through 5c illustrate an example suspended storage system.
Figure 5B:
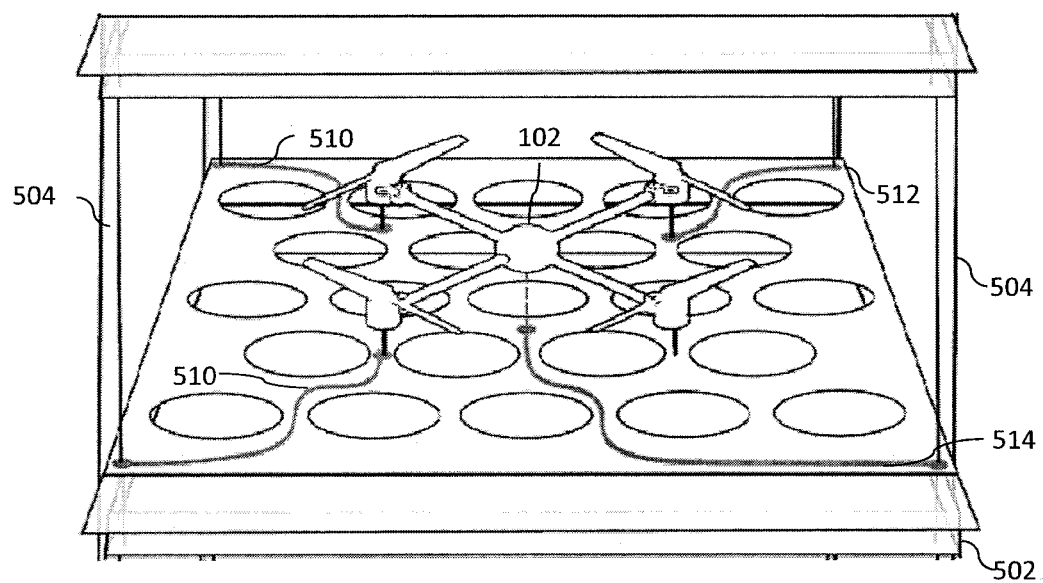
Figure 5C:
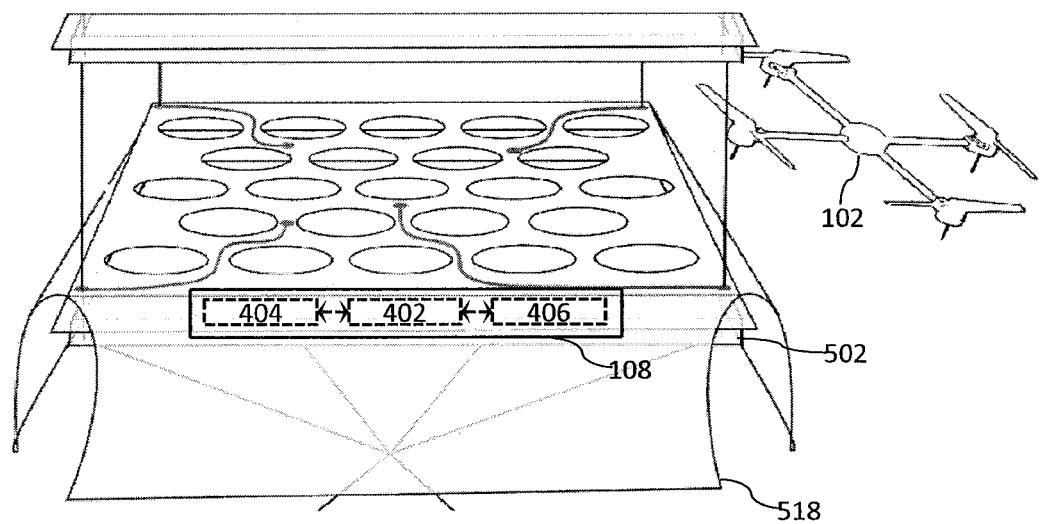

Suspended Storage System 106b. Where ground installation is impractical or undesired, a suspended storage system 106b may be employed as illustrated in FIGS. 5a through 5c. The overall structure of the suspended storage system 106b is a series of stacked platforms 502 (e.g., as illustrated, four platforms 502a, 502b, 502c, 502d) connected by support cables 504. The set of platforms 502 are suspended from a mounting point 506 (e.g., flagpole, side of building, etc.) and maintain separation between the platforms 502 using a combination of the platforms 502 own weight and tensioning lines 508 attached between the bottom platform 502a and the fixed surface 516 (e.g., a base of the ground). Hanging the suspended storage system 106b from a high point is beneficial from an aircraft flight perspective and also reduces the potential for tampering.

Power cables 510 and data cables 512 connect the platforms 502 of the storage system to maintain the defensive UAVs 102 ready for launch and in contact with the ground station controller 402. Power cables 510 and data cables 512 may wrap around, or integrate with, the support cables 504. As illustrated in FIG. 5c, the various electrical components (e.g., ground station controller 402, radio 404, and charging system 406) may be positioned in the bottom platform 502a to increase tautness of the system, while the antenna 408 may be positioned at a higher point (e.g., the top most platform 502d). Depending on the weight of the defensive UAVs 102 and/or the platforms 502, the power cables 510, data cables 512, and any other conductors (e.g., the launch conductors 514) may serve as support cables, thereby obviating the need for support cables 504.

The structure of the suspended storage system 106b may be fabricated from, inter alfa, circuit board material (e.g., Rogers RO4003C), fiberglass, vinyl fabric, steel cable, and/or nylon cord. Each platform 502 distributes power via power cables 510 and data via data cables 512 through contacts on the defensive UAV's 102 feet. The data and/or power could also be delivered to the defensive UAVs 102 wirelessly (e.g., inductive charging, RF, etc.). Each platform 502 may include baffled air passages to allow air to circulate through the enclosure, while keeping out rain, snow, and/or debris. Air circulation may be passive, active, or induced by the defensive UAV 102 periodically (e.g., at regular intervals) running its lift motors 208a at low power, which also serves as a built-in test of those motors. Air circulation is important to ensure that the defensive UAV 102 is not compromised by the temperature (e.g., reduced battery capacity due to cold, component failure due to extreme heat, etc.). The platform 502 may also have integrated heating elements to combat cold temperatures. Air circulation within one enclosure is independent of the others, preventing single point failures. Independence of the enclosures also ensures that some of the defensive UAVs 102 can be launched without impacting the readiness of the others. The sidewalls of the enclosure are hinged or otherwise fold open (in this notional concept, they are shown as fabric) to allow the vehicle to deploy.

The vehicle is positively secured to the platform 502 to ensure that it does not move around in transport or due to movement induced by weather, and to reliably maintain contact with power and data sources. When a launch signal is sent via launch conductors 514, the sidewalls 518 of the enclosure open (and drop down) and the vehicle is released from its positive capture (vehicle release signal carrier is shown as launch conductors 514). The vehicle then performs an initial maneuver to exit the enclosure before flying away. This initial maneuver may be aided by an intentional tilt of the platform 502 to create a preferred exit direction.

UAV Controller 108. While the UAV Controller 108 and the UAV storage system 106 are illustrated in FIG. 1 as separate components, as illustrated in FIGS. 4 and 5c, the UAV controller's 108 may reside in/be integral with the UAV storage system 106 and be connected to the defensive UAVs 102 through power and data links. As noted above, the UAV controller 108 generally comprises a ground station controller 402, a radio 404, and a charging system 406 to maintain the defensive UAVs 102 during long durations.

Communication may be achieved via a simple ground repeater unit (via the UAV controller 108 and/or the UAV storage system 106, for example) that contains a radio 404 compatible with the C-RAM C2 system 110 and a low-cost uplink to the defensive UAV 102. As can be appreciated, latency in this uplink should be minimized to provide effective control. Where the C-RAM C2 system 110 provides enough accurate relative position information to enable steering toward the target aircraft 104 without reference to GPS, a transformation matrix may be used to transform data from the C-RAM C2 system 110 into usable tracks by the aerial defense system 100 on the defensive UAV 102. The main obstacles in communication are size, weight, power and cost (SWaP-C) and security—radios such as the Rajant Breadcrumb and Persistent Systems MPU-4/5 may be necessary to integrate with C-RAM C2 system 110, but they are heavy, costly, and power hungry. Therefore, integrating a C-RAM C2 system 110-capable radio into the ground element (e.g., the UAV controller 108) of the aerial defense system 100 may be preferred via very low cost radios for encrypted uplink to the defensive UAV 102. This receive-and-disseminate approach requires very low latency translation/transfer of C2, but will reduce the cost of the defensive UAVs 102. Example low cost radios include, for example, those by TrellisWare Technologies and Silvus Technologies. The management and communication components can vary widely, and could be either minimized, e.g., communication could be directly to/from the interceptor instead of received and disseminated by the management and communication system. Various software components, including targeting and guidance components, could also be housed within the overall concept.

HMI device 114. FIGS. 6a through 6d illustrate an example HMI device 114 with various example display screens. The HMI device 114 provides an off-board, computer based system for initializing, arming, and updating status of the system, and for monitoring and status alerts after launch. The HMI device 114 provides for setup, monitoring, and post-launch control. The HMI device 114 may be integrated into software applications (e.g., ATAK, KILSWITCH, etc.). The HMI device 114 ensures effective command and control of the defensive UAVs 102, while providing situational awareness and control functionality. Information provided in the software application may include location of current threats and defensive UAVs 102, as well as health and status and potentially command functions. The interface would support a boot-up process that establishes the link and becomes operational with the external targeting and command and control system.

The HMI device 114 may be used to ensure effective command and control of the aerial defense system 100. The HMI device 114 may communicate with all elements of the aerial defense system 100 to provide situational awareness and control functionality. To that end, the HMI device 114 may receive both information on the location of current threats and defensive UAVs 102, as well as defensive UAV 102 health and status and defensive UAV 102 command functions. The HMI device 114 could also communicate with the various elements of the ground storage system, to enable initialization and monitoring of an entire battery of defensive UAVs 102. The system must also be integrated with the Static Interface C-RAM Communication Network (SI-CCN) and Encryption CCN (E-CCN), and support a boot-up process that establishes the link and becomes operational with the C-RAM C2 system 110 C2 system. While the aerial defense system 100 is illustrated as a single HMI device 114, multiple HMI devices 114 may be communicatively coupled with the aerial defense system 100 (e.g., via the UAV controller 108). For example, one or more operators may be provided with the ability to both monitor and control the defensive UAVs 102, while other operators (e.g., subscribers) may receive only alerts via their HMI devices 114. The HMI device 114 may also facilitate map-based indication of defensive UAV 102 trajectory and/or parameters. The HMI device 114 may also feature a wave-off button to enable the operator to abort a strike/engagement. If a wave-off command is received by the aerial defense system 100, the defensive UAV 102 (depending on the capabilities of the C-RAM C2 system 110) may assume one of a plurality of flight routines, include a recover routine, a loiter routine, a ground loiter routine, and an abort routine. In a recover routine, the defensive UAV(s) 102 may return to a base (home) or to another designated recover point. In a loiter routine, the defensive UAV(s) 102 may decline to engage the current target and wait until the next command from the C-RAM C2 system 110. In a ground loiter routine, the defensive UAV(s) 102 may land at designated location (observe) and hold for new target. In abort routine, the defensive UAV(s) 102 may shut down and drop to the ground. In certain aspects, the HMI device 114 may employ a tablet or cell-phone based interface to minimize the complexity of setup, to arm the system, inform users of the status and, on event of a launch, to provide users with options for how the intercept will be carried out. The HMI device 114 could be of various levels of complexity and functionality, or could be foregone completely, allowing the targeting system to act alone as the interface. If a HMI device 114 is incorporated, it could be on various forms of computers or handheld devices, and communicate with other components in various ways.

With reference to the figures, the HMI device 114 is illustrated with a tool bar area 618a and a primary display area 618b. The HMI device 114 serves as a channel of communication between the operator and the components of the aerial defense system 100. For example, the HMI device 114 may be used to command and receive feedback or instructions from the UAV storage system 106, UAV controller 108, and/or the defensive UAVs 102. The HMI device 114 can display, via a display device (e.g., a liquid crystal display (LCD)), the current state of UAVs 102 and/or of the aircraft (e.g., current settings). The HMI device's 114 GUI display may also be night-vision goggles compatible such that it is visible regardless of the operator's eyewear. The tool bar area 618a may be used to toggle between a main screen 620 via a main screen icon 602, a video feed screen 622 via a video icon 604, a map screen 624 via a map icon 606, and/or a setting screen via a settings icon 608.

Figure 6A:
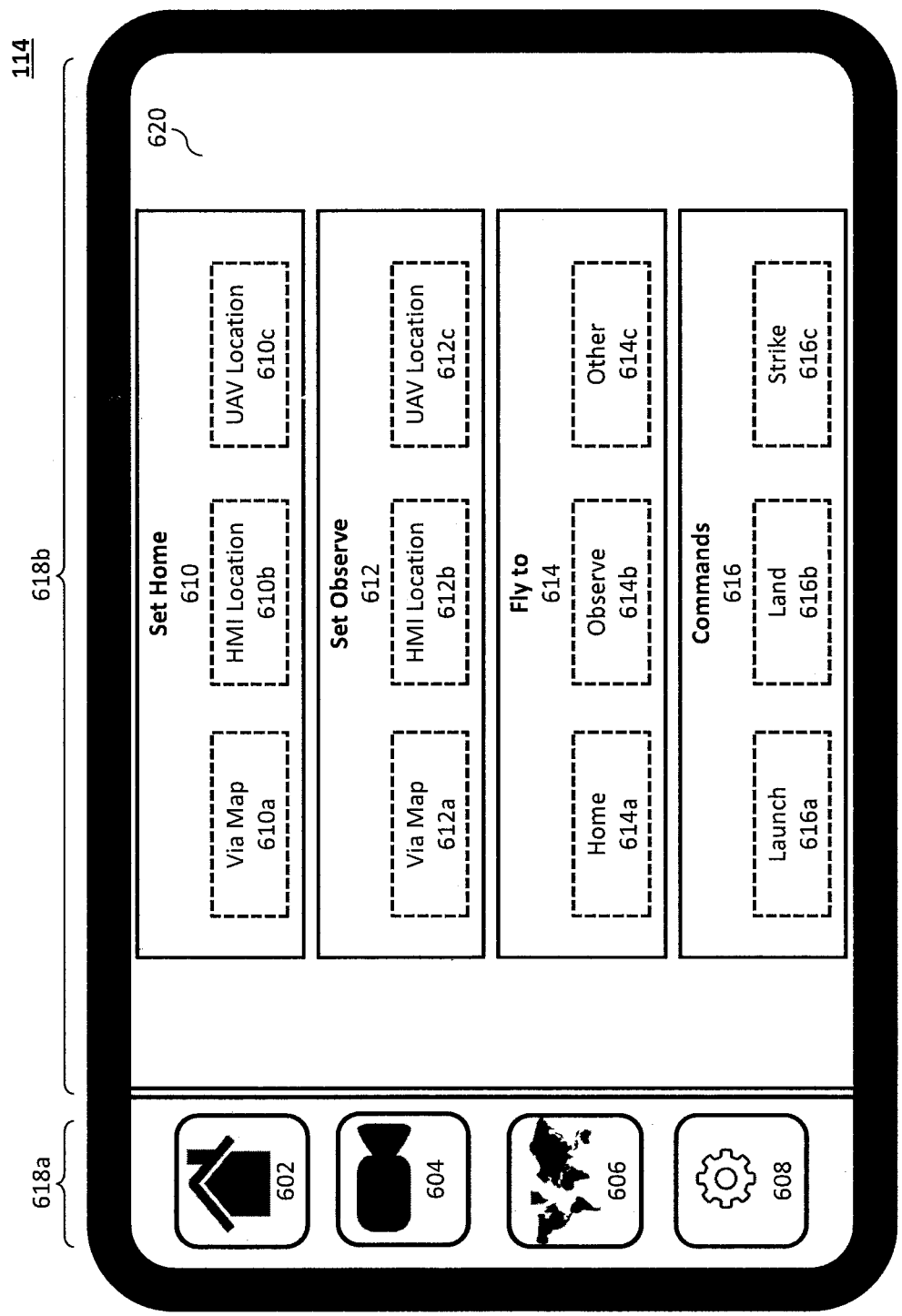
FIGS. 6a through 6d illustrate an example HMI device with various example display screens.

As illustrated in FIG. 6a, the main screen 620 may allow the user to set the home location (i.e., home coordinates) via a set home window 610. Within the set home window 610, the operator may set the home coordinates via the map 610a, as the current HMI location 610b (e.g., the location of the HMI as determined by an onboard tracking device, which may be based on GPS, triangulation techniques using communication towers, etc.), or as the current location of the UAV 610c, which may be based on the signals from the navigation system 224. The main screen 620 may allow the user to set the observation coordinates via a set observation window 612. Within the set observation window 612, like the set home window 610, the operator may set the observation coordinates via the map 612a, as the current HMI location 612b, or as the current location of the UAV 612c. Using the fly to window 614, the operator may instruct the defensive UAVs 102 to fly to (i.e., navigate to) the home coordinates 614a, the observation coordinates 614b, or other coordinates 614c. A command window 616 may be used to launch 616a, land 616b, and/or strike 616c (e.g., a target aircraft 104).

Figure 6B:
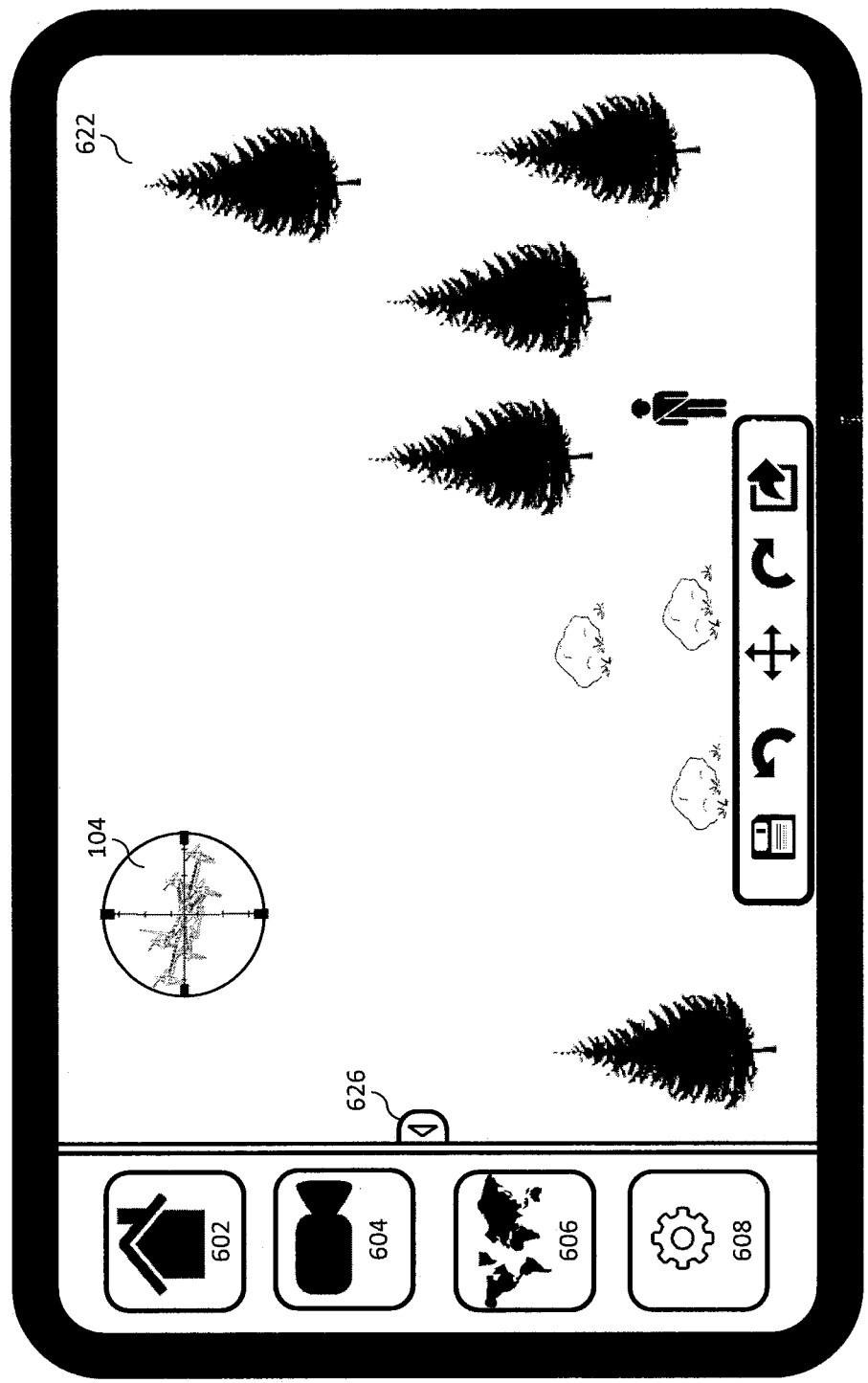
Figure 6C:
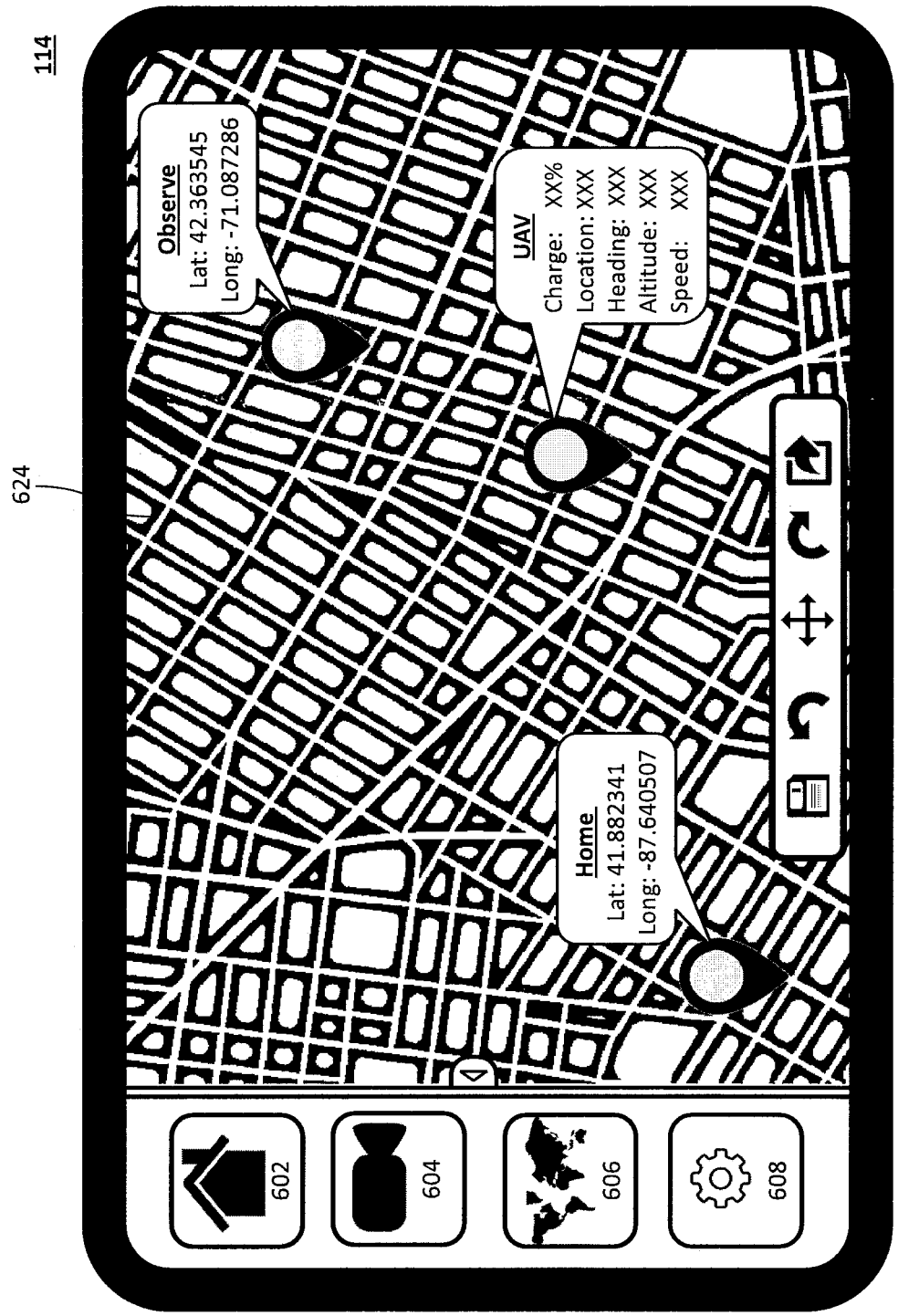
Figure 6D:
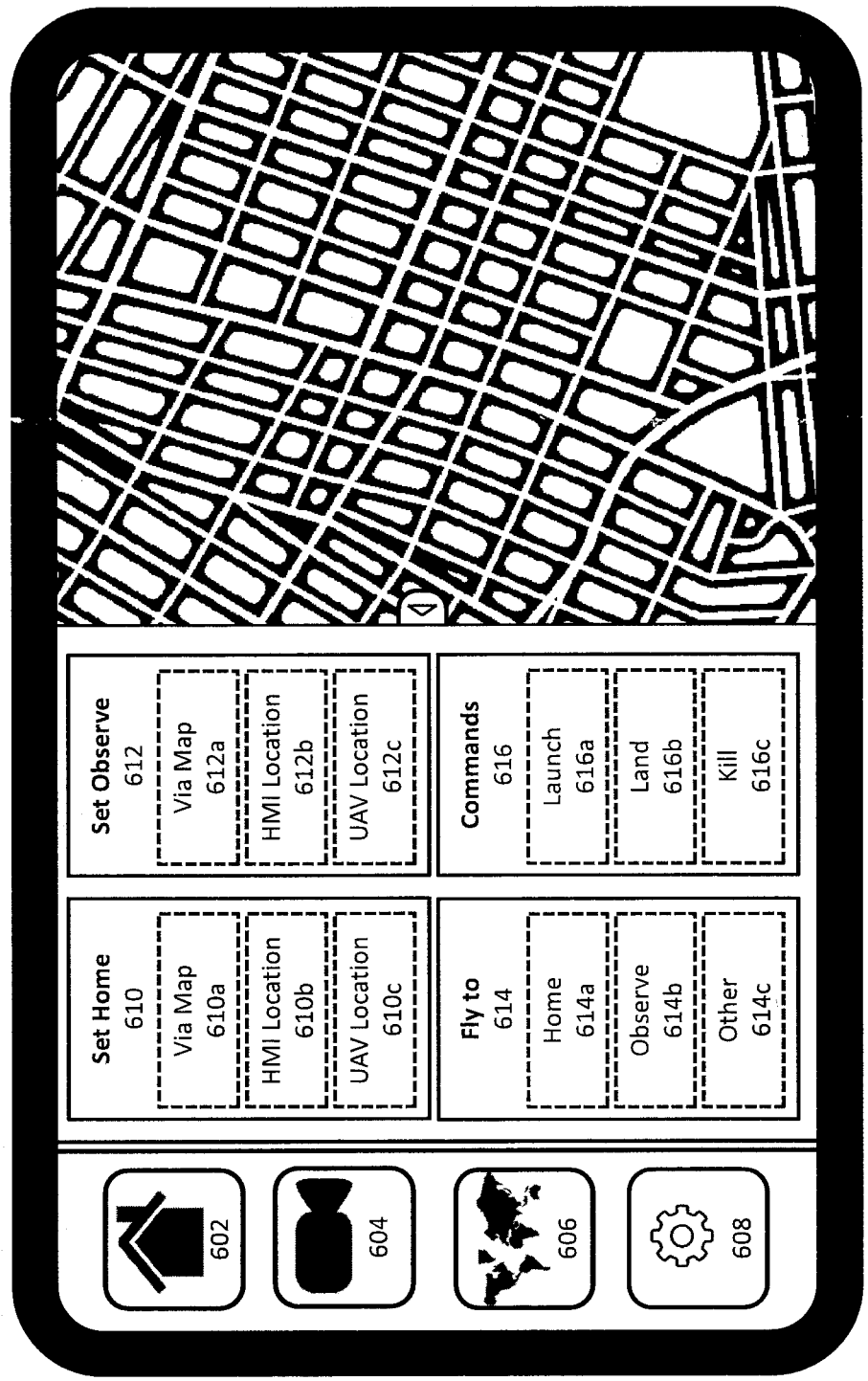

As illustrated in FIG. 6b, the video feed screen 622 may provide the user with the UAV's FOV, in real-time, from the sensor payload 226. The video feed may be as-captured by the onboard cameras 226a (e.g., actual video without VR/AR overlay), overlaid with measurement data, and/or even augmented with virtual reality (VR) overlay from a VR simulation system (e.g., VR simulation system 800). The video feed may be recorded for later retrieval and/or replicated on another device, such as display headset (e.g., a VR headset) and/or display screen (e.g. an LCD display). As illustrated in FIG. 6c, the map screen 624 may display on a map the home location, the UAV location, and an observation location. Each of the locations may be provided with a callout window providing, inter alfa, the coordinates. The UAV location may further provide operational parameters of the defensive UAV(s) 102, such as the fuel/battery charge level, altitude, speed, and/or heading. The icons of the main screen 620 may be accessed from the various screens via a pull tab icon 626. For example, as illustrated in FIG. 6d, the primary display area 618b may simultaneously display the main screen 620 icons and another screen (e.g., the map screen 624) or portion thereof, thereby allowing the operator to change/adjust one or more parameters, while monitoring for example, the map and/or video.

Target Neutralization. The target neutralization process may be generally divided into three phases; the pre-engagement, engagement, and post-engagement phases. Targeting can be performed in a number of ways, but one instantiation is to do preliminary guidance toward the target using uplinked commands from an external targeting system (routed either directly to the vehicle or relayed through a low-cost radio pair by the interceptor management and communication system), followed by terminal guidance using a vision-based guidance system.

Pre-Engagement. An objective of the aerial defense system 100 is engagement with a target aircraft 104. That is, once the aerial defense system 100 has performed a find, fix, track, and target of the target aircraft 104, the aerial defense system 100 receives remote launch commands, navigation information, tracks, and metadata from external systems using common data formats such as C-RAM C2 system 110, with interface details. The aerial defense system's 100 forward emplacement includes the UAV controller 108 communicatively coupled with one or more UAV storage systems 106, each of which contain multiple defensive UAVs 102. The UAV storage systems 106 may be positioned at high points surrounding an area of interest, such as an encampment. The UAV controller 108 and one or more UAV storage systems 106 may be co-located or remotely situation and communicatively coupled wirelessly or via cables.

Once the antennas (e.g., radio antennas) are set up and the aerial defense system 100 is powered on, the aerial defense system 100 establishes communication link and verifies it is operational with, for example, the brigade (BDE) tactical operations center's (TOC) C-RAM C2 system 110. The aerial defense system's 100 progress and status may be displayed to an operator (e.g., a soldier) via the HMI device 114 via a setup interface display screen. Through the HMI device 114, the operator may arm the aerial defense system 100 and define wave-off/return points. Once set up, the HMI device 114 may transition from a setup screen to status and wave-off interface screen. Other operators (e.g., soldiers) can subscribe to existing emplacements via their HMI devices 114.

Engagement. During engagement, one or more defensive UAVs 102 may broadcast its GPS locations to a C-RAM C2 system 110, which uses those locations to choose which defensive UAV(s) 102 to launch and guide to intercept a target aircraft 104. The defensive UAV 102 relies on external C-RAM C2 system 110 sensors to find a target aircraft 104 and to establish its trajectory. The C-RAM C2 system 110 receives information pertaining to the target aircraft 104 from various sensors. Based on information communicated by armed systems, the C-RAM C2 system 110 determines available defensive UAVs 102.

The C-RAM C2 system's 110 launch command may include trajectory data reflecting the target aircraft's 104 flight path/trajectory. The C-RAM C2 system 110 may then launch one or more defensive UAVs 102, providing tracks that update en route to the target aircraft 104. In operation, the C-RAM C2 system 110 not only launches the defensive UAV 102, but also provides sufficient information, in a format to be communicated to a remote location (e.g., a base station) to perform intercept guidance (i.e., proportional navigation) toward the target aircraft 104. This could take the form of acceleration commands (as to a missile), or relative position of the aircraft (defensive UAV 102) and the target aircraft 104, from which the remote location will derive the navigation commands.

The defensive UAV 102 calculates an intercept point and flies towards that point. The defensive UAV 102 continues receiving target aircraft 104 updates from the C-RAM C2 system 110 while in flight, recalculates the likely intercept point, and adjusts its flight trajectory accordingly. Once close enough to the target aircraft 104, the drone assigns more weight to internal sensors, and identifies the target aircraft 104. Using precise data from internal sensors, the defensive UAV 102 continuously maneuvers to fly into the target aircraft 104, damaging the target aircraft 104 beyond flight capability, and, in some cases, damaging itself. If the target aircraft 104 is destroyed, any backup follower defensive UAVs 102 may return to base, where its batteries can be swapped out or charged.

Figures 7A, 7B:
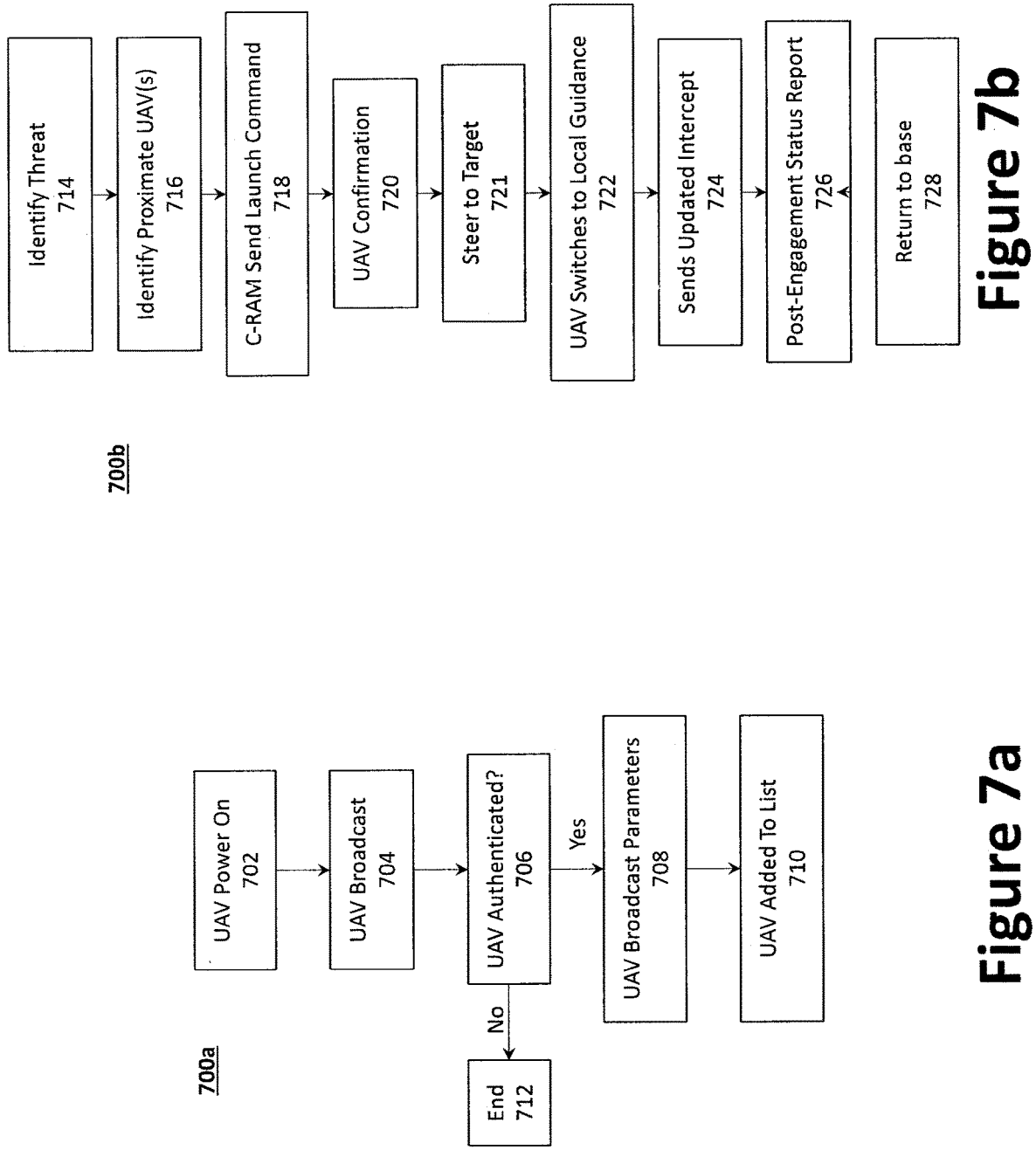
FIG. 7a illustrates an example message exchange sequence between a defensive UAV and a C-RAM C2 system during UAV registration.
FIG. 7b illustrates an example message exchange sequence between a defensive UAV and a C-RAM C2 system during deployment and engagement.

FIG. 7a illustrates an example message exchange sequence between the defensive UAV(s) 102 and the C-RAM C2 system 110 during UAV registration 700a. At step 702, the defensive UAV 102 powers on. The defensive UAV 102 may be powered on via a remote control and/or a physical switch. For example, the defensive UAV 102 may power on automatically once fully charged. At step 704, the defensive UAV 102 wirelessly broadcasts (e.g., advertises) its availability and its unique identification (ID). The wirelessly broadcast may be encrypted and only readable by, for example, the C-RAM C2 system 110 or another component of the aerial defense system 100.

At step 706, the C-RAM C2 system 110 conducts a handshake protocol (which may be encrypted as well) with the defensive UAV 102 directly or indirectly using a relay (e.g., the UAV controller 108) to authenticate the defensive UAV 102. If the C-RAM C2 system 110 or UAV controller 108 cannot authenticate the defensive UAV 102, the C-RAM C2 system 110 or UAV controller 108 may flag the defensive UAV 102 as a threat and/or alert an operator via the HMI device 114 before exiting the authentication process at step 712. If the defensive UAV 102 is deemed a threat, the C-RAM C2 system 110 may command another defensive UAV 102 to destroy the unauthenticated defensive UAV 102 (e.g., using the protocol of FIG. 7b).

Once authenticated, the defensive UAV 102 may report its various parameters at step 708. Example parameters include, for example, its position, status, battery state/range, etc. The defensive UAV 102 may periodically report its parameters. For example, the defensive UAV 102 may regularly broadcast its parameters at set periods, which may function as a heartbeat message to confirm the defensive UAV 102 is still available. Alternatively, the defensive UAV 102 may broadcast its parameters in response to an event. For example, if one of the parameters changes (e.g., the location changes, the battery begins to deplete, etc.), the defensive UAV 102 may alert the C-RAM C2 system 110. At step 710, the C-RAM C2 system 110 adds the defensive UAV 102 to list of available defensive UAVs 102, along with its current parameters.

Initial steering may be provided via the UAV controller 108 on ground, based on trajectory updates from C-RAM C2 system 110. Terminal guidance may be achieved autonomously using on-board camera-based homing system, when range is low enough to render homing relatively simple. A target neutralization device (e.g., a deployable net, gun, etc.) may be engaged as needed (e.g., via the aircraft processor 216). Once the defensive UAV 102 is within a predetermined distance (e.g., approximately 50 meters) of the target aircraft 104, the camera-based seeker system may scan for the target aircraft 104.

An immediate strafing pass can be performed during engagement, with the defensive UAV 102 on a missile-like collision course with the target aircraft 104. Depending on the relative aircraft speeds and encounter angles, this may be sufficient for a strike. If it does not result in a strike, or closure rates are deemed too high to maintain a 'lock' on the target, the defensive UAV 102 may pass by the target aircraft 104 and line up for a second pass. The second pass will take advantage of the defensive UAV's 102 superior speed and maneuverability to get into a trailing position, allowing a relatively low-speed approach and strafe of the target aircraft 104. When performing a strafing maneuver (or set of maneuvers), the aerial defense system 100 must perform additional functions. First, the aerial defense system 100 must perform the 'track to engage' guidance calculations to get into trailing position of a moving, potentially maneuvering target aircraft 104. Second, it must set up an approach that maintains a suitable position with respect to the target aircraft 104 for strafing. Third, MIDAS must set up a strafing approach, which may involve speed control, flight path angle control, and adjustments for gravity and wind to set up a stable platform from which to fire. Next, the target neutralization device (or other weapon) itself must be steered toward the target aircraft 104. During strafing, the steering device (turret, gimbal, or other mechanism) will point the weapon. The aerial defense system 100 will command the extra degrees of freedom of the steering device based on camera-based seeker inputs. For instance, the seeker could be mounted on the fuselage itself ('bore-sited'), and logic switched from providing vehicle acceleration commands (to steer the center of gravity toward the target) to weapon pointing commands (to perform strafing). In addition, the elevational and azimuthal offset of the target with respect to the defensive UAVs 102 flight path could be accommodated by commanding the defensive UAV 102 or its sub-components to pitch or yaw, if these degrees of freedom exist, resulting in an over-pitched or side-slipping flight with respect to the path. In this instance, longitudinal/ lateral acceleration, speed, and flight-path relative to the yaw attitude/fuselage pitch commands must be carefully mixed to maintain the vehicle in the camera field of view and point the weapon toward the target.

With the defensive UAV 102 in close trail, the target aircraft 104 illuminated, and the target neutralization device properly aligned using the seeker system, the target neutralization device can be triggered via, for example, the aircraft processor 216. Damage assessment can be performed by simply continuing to seek and pursue the target in 'strafing mode'. All systems may continue their targeting operations until the target can no longer be tracked—i.e. it is accelerating (falling) downward too quickly to pursue.

FIG. 7b illustrates an example message exchange sequence between the defensive UAV(s) 102 and the C-RAM C2 system 110 during deployment and engagement 700b (e.g., strike). At step 714, the C-RAM C2 system 110 identifies a threat (e.g., a target aircraft 104). The C-RAM C2 system 110 may determine the current location and trajectory of the threat. At step 716, the C-RAM C2 system 110 identifies one or more defensive UAVs 102 proximate to the threat (based on their last known locations). For example, the C-RAM C2 system 110 may identify the two or more defensive UAVs 102 for deployment within a predetermined distance of the threat's current location, or along the threat's trajectory. At step 718, the C-RAM C2 system 110 sends (e.g., transmits) a launch command message to the one or more defensive UAVs 102 identified in step 716. The launch command message includes the target location and trajectory. At step 720, in response to the launch command message, the one or more defensive UAVs 102 respond with an acknowledgment (confirmation) message. The C-RAM C2 system 110 may periodically send trajectory updates to the one or more defensive UAVs 102, each of which may respond with confirmations and its predicted intercept point. At steps 721, the defensive UAV 102 may be configured to steer toward the target aircraft under an external guidance mode.

At step 722, the defensive UAV 102 switches to a local guidance mode (i.e., self-guidance using on board sensors). For example, the defensive UAV 102 may switch to local guidance mode when the target is within range of the defensive UAV's 102 onboard sensor payload. While in local guidance mode, the defensive UAV 102 may periodically update the C-RAM C2 system 110 at step 724 with calculated intercept point (e.g., as it changes, or simply supply it at periodical regular intervals). The defensive UAV 102 may remain in local guidance mode until target engagement (e.g., target strike). For example, the defensive UAV 102 may strike the target aircraft 104 using onboard projectiles, nets, or by simply crashing into the target aircraft 104. If the defensive UAV 102 remains operational post-engagement, the defensive UAV 102 may report at step 726 its health status to C-RAM C2 system 110. The health status may include battery level, status of its flight components (e.g., the operational status of onboard systems). Depending on the health status, the C-RAM C2 system 110, the UAV controller 108 (e.g., via the HMI device 114), or another system may instruct the defensive UAV 102 to autonomously land for later retrieval or to engage another target. When possible, the defensive UAV 102 may report at step 728 a return to base message and attempt to autonomously return to a home base, or other predetermined location.

Post-Engagement. If the target aircraft 104 survives (e.g., a near miss), additional defensive UAVs 102 could follow to increase the likelihood that the target aircraft 104 is neutralized. In certain aspects, the target aircraft 104 may make multiple passes to increase the likelihood that the target aircraft 104 is neutralized. If the defensive UAV 102 survives after a successful engagement, the defensive UAV 102 may autonomously return to pre-defined recovery point. Due to accelerations and battery discharge, the defensive UAV 102 may require a recharge before re-use.

Virtual Reality Hardware In-loop Sensor Simulations. A virtual reality (VR) or augmented reality (AR) simulation system may be used to create both a high fidelity, photo-realistic aerial simulation environment in which navigation autonomy algorithms can be developed and an avionics kit to couple flight characteristics to a simulated environment on UAS from Group 1 to Group 5 with fewer experimental flight hours. While the VR and AR simulation systems will be generally described as it relates to the aerial defense system 100 and the defensive UAV 102, the VR simulation system may be applied to virtually any vehicle (whether air, land, or sea). For example, this type of system may be used for cars or boats, which can be limited to the 2D whereas aerial systems would require a 3D solution. In addition to optical simulations, simulations using radar, LiDAR, thermal, or other sensing modality are contemplated. A VR or AR simulation system may also serve very useful when performing aerial manipulations or aerial acrobatics. For aerial manipulation, the capability to simulate artificial constraints (hidden alleyways, etc.) can enable robustness of system testing. For aerial acrobatics, this precise positioning capability will enable better modeling of the nonlinearity in the flight dynamics.

An aerial simulation environment may be used that uses a graphics software engine (e.g., Unity3D or Unreal) and tightly couples to the motion of the defensive UAV 102. For example, the VR simulation system may be used to render (in real-time, or near real-time) the emulated camera imagery that would be captured by an optical camera (e.g., via the sensor payload 226) on the defensive UAV 102 in the virtual environment based on the measured position and pose of the defensive UAV 102. For example, the image may be fully simulated in a VR system, while simulated structures/objects may laid over an actual image in an AR system.

The defensive UAV's 102 response to feedback from the emulated sensor/camera imagery may be used to constitute a flight test in the virtual environment. For example, the navigation system 224 (e.g., the RTK GPS/INS) may be used to capture the defensive UAV's position and pose, while emulating sensor modalities beyond the current optical camera to incorporate radar, long wave infrared, sonar, LiDAR, etc. Such VR and AR systems would enable projects developing novel navigation autonomy algorithms to be performed with reduced costs by decreasing the number of experimental flight hours, reduce risks associated with flight vehicle accidents, and improve the timeliness and thoroughness of test and evaluation outcomes by enabling the use of Monte-Carlo, flight-based verification of the algorithmic robustness against all possible scenarios.

The VR simulation system may include algorithm to test features such as sense and avoid, which will prove useful in vehicle-to-vehicle collision encounters. The aerial simulation environment, which utilizes Unity3D or Unreal as the graphics engine, supports the use of the PhysX SDK, which enables real-time performance and robust behavior of interactions by detecting collisions, performing ray-casting, and solving for rigid body dynamics, fluids, and particles. It is a scalable solution, supported on a wide range of devices, from smartphones to CPUs and GPUs. Tightly coupling the aerial capabilities of actual defensive UAVs 102 in flight with the visualization capabilities enabled by GPU-driven physics engines allows for greater capabilities by creating a simulation infrastructure that is more functional and greater fidelity than traditional, on-the-bench hardware-in-the-loop (HIL) simulations. By connecting the embedded solution to the actual vehicle in a simulated environment that has the capability to easily reconfigure and adjust obstacles in the air or on the ground, we believe the quality of testing will be improved by an order of magnitude from the current standards.

With reference to FIG. 8, the VR simulation system 800 may generally comprise a local RTK GPS 806, a simulation computer 802, and a local wireless transceiver 804. The VR simulation system 800 may be communicatively directly coupled with the defensive UAV 102 of indirectly coupled via a network 228 (and associated hardware). The simulation computer 802, which includes a processor 802a operatively coupled with a memory device 802b, may be used to provide both virtual reality sensing and autonomy algorithms (e.g., simulation environment and avionics kit for navigating SUAS in GPS-denied scenarios (SENsinG), discussed below). The simulation computer 802 may be operatively controls with one or more user devices, such as a display device (e.g., a virtual reality headset 808, a computer monitor 810, etc.) and/or user interfaces 812 (e.g., a keyboard, mouse, touch screen overlay, etc.). As data inputs to the virtual reality sensing and autonomy algorithms, the simulation computer 802, via the antenna of a local wireless transceiver 804, may communicate with, or otherwise receive data from, the defensive UAV's 102 GPS 224a, IMU 224c, and aircraft processor 216.

On the defensive UAV 102, the GPS 224a may provide centimeter level accuracy regarding the position of the defensive UAV 102, while the IMU 224c provides 9-DOF pose information. The aircraft processor 216 fuses the data from the GPS 224a and IMU 224c into high-fidelity vehicle state (pose and position) information for transmission via the aircraft wireless transceiver 222. For example, the aircraft processor 216 may fuses the GPS and IMU data using an extended Kalman filter (EKF) to provide the high-fidelity vehicle state information. In operation the RTK GPS provides low frequency information whereas the IMU provides high frequency information; the EKF provides a smoothed position and pose output. By combining these two things, most computation occurs on the ground, thereby allowing the aerial vehicle to have minimal payload. By taking advantage of RTK GPS and IMU, virtual reality HILSIM can be performed outdoors with large defensive UAVs 102. This enables autonomy algorithms to be tested in empty airspace but simulate a city in the virtual reality environment. For example, many algorithms can be tested without crashing the defensive UAVs 102.

The simulation computer 802 uses the defensive UAV's 102 state information to create a virtual reality sensor inputs. These inputs are used to test autonomy algorithms, which can feed back through the radios to the defensive UAV 102 and controls the defensive UAV 102. For example, the information is fed over the transceiver 222, via the antenna of a local wireless transceiver 804 to the VR simulation system 800 on the ground. Using the VR simulation system 800, the simulation computer 802 determines the virtual reality sensor information and then, controls the defensive UAV 102 to take action based on these perceived inputs (autonomy algorithms). For example, the radios communicate between the defensive UAV 102 in the sky and the ground control station with the RTK GPS base station, radio and simulation computer 802.

The VR simulation system 800 renders (in real-time) the imagery that would be captured by an optical camera on the vehicle in the virtual environment based on the measured position and pose. The defensive UAV's 102 response to feedback from the emulated camera imagery constitutes a flight test in the virtual environment. Under this program, the capability of the aerial visualization would be expanded to allow for defensive UAVs 102 to be flown outdoors, with RTK GPS/INS capturing the defensive UAV's 102 position and pose, and emulated sensing modalities beyond the current optical camera.

The VR simulation system 800 may be facilitated via a modular avionics kit that can be utilized by multiple airframe platforms. For example, the VR simulation system 800 may employ a development kit (e.g., Jetson TX1 or TX2) and sensors, interfacing with the flight controls via a flight controller (e.g., an F4 advanced flight controller) or other embedded processor, and a RTK GPS/INS would service most sUAS platforms. In one aspect, the modular avionics kit may contain a carrier board (Jetson TX1), one or more cameras, a RTK GPS/INS, and an IMU, enabling many navigation autonomy capabilities. Adding the RTK GPS/INS to the modular avionics kit enables outdoor experimentation, thereby allowing testing over far greater range under realistic environmental conditions (winds, gusts, temperature, etc.). The modular avionics kit may be used on virtually an aircraft, ranging from nano-drones (<60 g) (e.g., the Parrot Rolling Spider Drones) to large payload carrying aircraft.

Figure 9B:
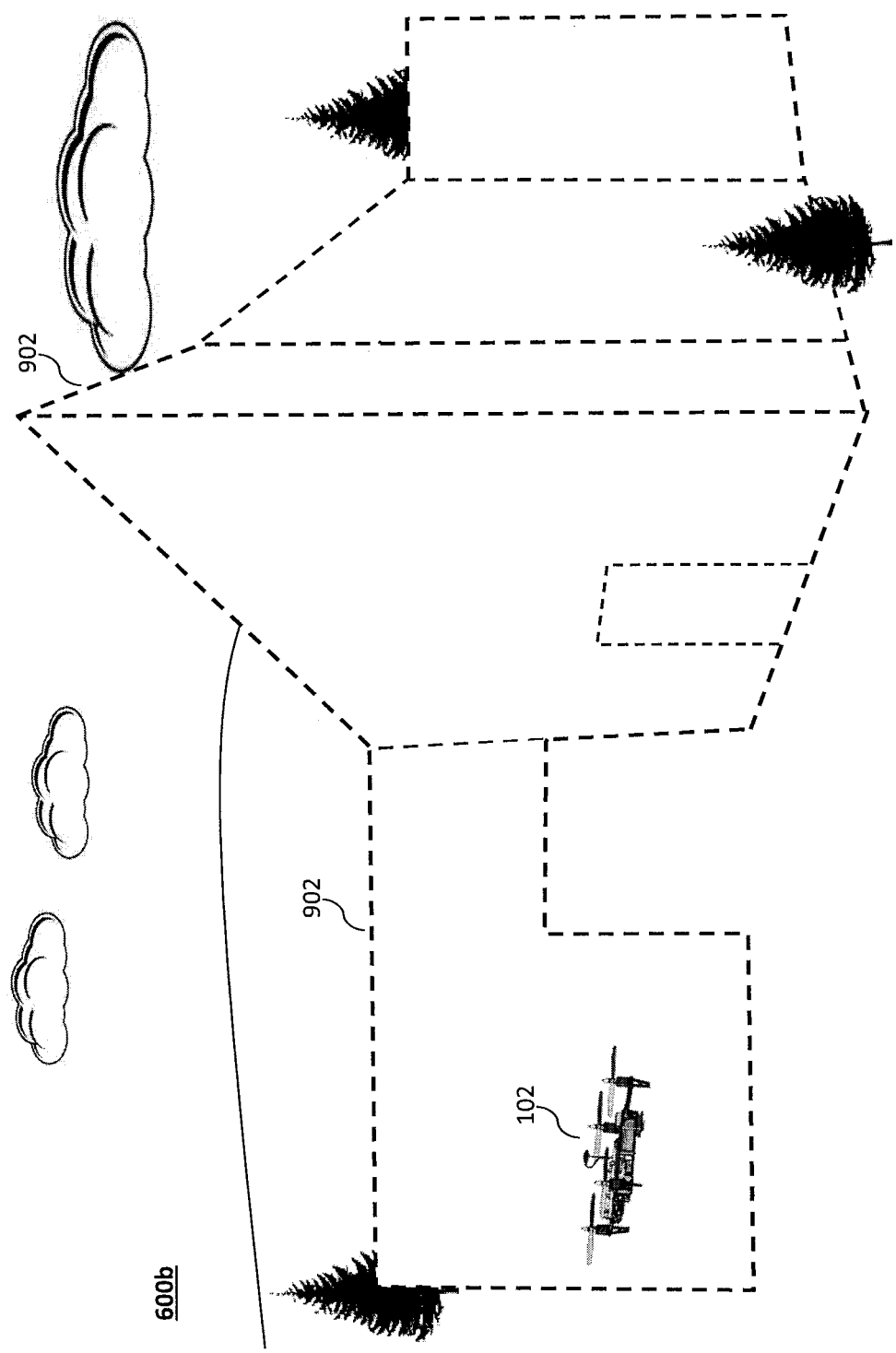
FIG. 9b illustrates the example real world space over FIG. 9a overlaid with virtual reality arbitrary obstacles.

With reference to FIG. 9a, as the defensive UAV 102 moves in a real world space 600a (described with 6 degrees of freedom by its position and pose), the real world space 600a as sensed by sensors on the defensive UAV 102 is modified/augmented by the simulation computer 802. By creating the sensing inputs in such a simulated environment, simulated obstacles 902 may be generated and displayed/overlaid, as shown in FIG. 9b, via the virtual reality headset 808, the computer monitor 810, or HMI device 114. The simulated obstacles 902 may include moving or static objects, such as manmade objects (e.g., buildings, vehicles, power lines, etc.) and/or natural objects (e.g., trees, mountains, birds, etc.). The simulated obstacles 902 are easily reconfigurable. Accordingly, such adjustable simulated obstacles 902 allow engineers to perform an infinite number of flight tests with arbitrary targets with minimal risk of damage of to the defensive UAV 102, since the obstacles and potential collisions are simulated, rather than experimentally created.

The above-cited patents and patent publications are hereby incorporated by reference in their entirety. Where a definition or the usage of a term in a reference that is incorporated by reference herein is inconsistent or contrary to the definition or understanding of that term as provided herein, the meaning of the term provided herein governs and the definition of that term in the reference does not necessarily apply. Although various embodiments have been described with reference to a particular arrangement of parts, features, and the like, these are not intended to exhaust all possible arrangements or features, and indeed many other embodiments, modifications, and variations will be ascertainable to those of skill in the art. Thus, it is to be understood that the teachings of the subject disclosure may therefore be practiced otherwise than as specifically described above.

What is claimed is:

1. A tracking system to mount to a vehicle and to image and track a moving object in an area, the tracking system comprising:
   a structured light source operatively coupled to a processor;
   an inertial measurement unit (IMU) operatively coupled with the processor, wherein the IMU is configured to generate position data representing a position of the vehicle;
   a mirror to steer light from the light source toward the moving object; and
   a stereo-vision system having a first camera and a second camera, the stereo-vision system being operatively coupled to the processor and configured to generate image data of the area at a refresh rate that is at least 800 HZ,
   wherein the processor is configured to modulate the structured light source with a signal synchronized to the stereo-vision system to capture of the moving object with the light and without the light,
   wherein the processor is configured to identify the moving object by comparing the images of the moving object and removing a background portion of the images,
   wherein the stereo-vision system is configured to determine a three-dimensional position of the moving object as a function of both the position data of the vehicle and the image data, and
   wherein the processer is configured to determine a predicted three-dimensional position for the moving object as a function of both the position data of the vehicle and the three-dimensional position of the moving object.

2. The tracking system of claim 1, wherein the mirror is configured to direct the light from the light source toward the moving object as a function of a mirror position, wherein the processor is configured to adjust the mirror position.

3. The tracking system of claim 1, wherein the structured light source is a laser light source configured to generate light with a wavelength in the 450-495 nm light spectrum.

4. The tracking system of claim 1, wherein the structured light source is a laser light source configured to generate light with a wavelength in the blue light spectrum.

5. The tracking system of claim 4, wherein the stereo-vision system includes a bandpass filter.

6. The tracking system of claim 1, wherein the mirror is an electro-mechanical systems (MEMS) mirror.

7. The tracking system of claim 1, wherein the first camera provides a first field of view (FOV) and the second camera provides a second FOV.

8. The tracking system of claim 7, wherein the structured light source is configured to generate light that overlaps with at least a portion of each of the first FOV and the second FOV.

9. The tracking system of claim 1, wherein the processor is configured to control positions of each of the mirror, the first camera, and the second camera based at least in part on the position data from the IMU.

10. The tracking system of claim 1, wherein the vehicle is an aircraft and the moving object is an unmanned aerial vehicle.

11. A method of imaging and tracking a moving object using a sensor payload mounted to a vehicle, the method comprising the steps of:
   generating, via an inertial measurement unit (IMU) operatively coupled with a processor, position data reflecting a position of the vehicle;
   generating light via a structured light source operatively coupled to the processor;
   steering the light from the structured light source toward the moving object via a mirror as a function of a mirror position, wherein the processor is configured to adjust the mirror position;
   modulating the structured light source, via the processor, with a signal synchronized to a stereo-vision system;
   capturing images of the moving object with the light and without the light at a refresh rate that is at least 800 Hz;
   comparing the images of the moving object to generate image data, wherein a background portion in the images is removed to identify the moving object;
   determining, via the stereo-vision system coupled to the processor, a three-dimensional position of the moving object as a function of the position data of the vehicle and the image data, wherein the stereo-vision system comprises a first camera and a second camera; and
   determining, via the processor, a predicted three-dimensional position for the moving object as a function of the position data and the three-dimensional position.

12. The method of claim 11, wherein the structured light source is a laser light source configured to generate light with a wavelength in the 450-495 nm light spectrum.

13. The method of claim 11, wherein the structured light source is a laser light source configured to generate light with a wavelength in the blue light spectrum.

14. The method of claim 11, wherein the mirror is an electro-mechanical systems (MEMS) mirror.

15. The method of claim 11, wherein the first camera provides a first field of view (FOV) and the second camera provides a second FOV, and the light illuminates an area that overlaps with at least a portion of each of the first FOV and the second FOV.

16. The method of claim 15, wherein at least a portion of the first FOV overlaps with a portion of the second FOV.

17. The method of claim 11, wherein the processor is configured to control a position of each of the mirror, the first camera, and the second camera based at least in part on the position data from the IMU.

18. An aircraft to image and track a moving object, the aircraft comprising:
   an airframe;
   a structured light source mounted to the airframe and operatively coupled to a processor;
   an inertial measurement unit (IMU) operatively coupled with the processor, wherein the IMU is configured to generate position data representing a position of the aircraft;
   a mirror to steer light from the light source as a function of a mirror position, wherein the processor is configured to adjust the mirror position; and
   a stereo-vision system having a first camera and a second camera, the stereo-vision system being mounted to the airframe and operatively coupled to the processor,
   wherein stereo-vision system is configured to operate with a refresh rate that is at least 800 Hz,
   wherein stereo-vision system is configured to modulate, via the processor, the light source with a signal synchronized to the stereo-vision system to capture images of the moving object with the light and without light,
   wherein the stereo-vision system is configured to identify, via the processor, the moving object by comparing the images of the moving object and removing a background portion of the images, wherein the stereo-vision system is configured to determine a three-dimensional position of the moving object relative to the aircraft,
wherein the processer is configured to determine a predicted three-dimensional position for the moving object as a function of the position data and the three-dimensional position.

19. The aircraft of claim 18, wherein the mirror is configured to direct the light from the light source toward the moving object based at least in part on the position data from the IMU.

20. The aircraft of claim 18, wherein the processor is configured to control a position of the mirror based on input from an acoustic sensor equipped to the aircraft.

* * * * *